(12) United States Patent
Saarikoski et al.

(10) Patent No.: US 10,406,747 B2
(45) Date of Patent: Sep. 10, 2019

(54) COMPOSITE MATERIAL FOR ADDITIVE MANUFACTURING OF A THREE-DIMENSIONAL COMPOSITE PRODUCT

(71) Applicant: UPM-Kymmene Corporation, Helsinki (FI)

(72) Inventors: Eve Saarikoski, Helsinki (FI); Harri Kosonen, Lappeenranta (FI); Ari P. Kinnunen, Lahti (FI); Ari Nurminen, Lahti (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 30 days.

(21) Appl. No.: 15/499,117

(22) Filed: Apr. 27, 2017

(65) Prior Publication Data
US 2017/0361527 A1    Dec. 21, 2017

(30) Foreign Application Priority Data

Jun. 17, 2016 (EP) ..................................... 16397521

(51) Int. Cl.
*B29C 64/118* (2017.01)
*B33Y 70/00* (2015.01)
(Continued)

(52) U.S. Cl.
CPC ............ *B29C 64/118* (2017.08); *B33Y 70/00* (2014.12); *C08L 67/04* (2013.01); *D01F 2/00* (2013.01);
(Continued)

(58) Field of Classification Search
CPC ......... B33Y 10/00; B33Y 80/00; B33Y 50/02; B33Y 70/00; D01F 6/60; D01F 2/00;
(Continued)

(56) References Cited

U.S. PATENT DOCUMENTS

2016/0208094 A1*  7/2016  Wolfe .................... C08L 67/04

FOREIGN PATENT DOCUMENTS

CN    104356618 A    2/2015
CN    105585830 A    5/2016
(Continued)

OTHER PUBLICATIONS

European Search Report for European Application No. 16397521; Date of Completion: Dec. 13, 2016; 2 pages.
(Continued)

*Primary Examiner* — Camie S Thompson
(74) *Attorney, Agent, or Firm* — Cantor Colburn LLP

(57) ABSTRACT

The invention relates to a composite material filament having rheological characteristics suitable for use in additive manufacturing by extrusion, a method for manufacturing a three-dimensional composite product with an additive manufacturing system from a filament of such composite material, and to a three-dimensional composite product obtained by an additive manufacturing system using such composite material. The filament is formed of material comprising semi-crystalline polylactic acid and chemical pulp of wood-based cellulose fibers, wherein the amount of chemical pulp of wood-based cellulose fibers is selected such that sufficient complex viscosity is obtained at melt state, such that upon additive manufacturing by extrusion, composite melt formed of the filament has a ratio of shear storage modulus to shear loss modulus G'/G" equal to or higher than 1.0 at a temperature equal to or higher than 133° C.

21 Claims, 6 Drawing Sheets

(51) Int. Cl.

| | | |
|---|---|---|
| *C08L 67/04* | (2006.01) | |
| *D01F 2/00* | (2006.01) | |
| *D01F 6/06* | (2006.01) | |
| *D01F 6/62* | (2006.01) | |
| *B33Y 10/00* | (2015.01) | |
| *B33Y 50/02* | (2015.01) | |
| *B33Y 80/00* | (2015.01) | |
| *B29C 64/393* | (2017.01) | |
| *B29K 67/00* | (2006.01) | |
| *B29K 401/00* | (2006.01) | |
| *B29K 423/00* | (2006.01) | |

(52) U.S. Cl.
CPC ............. *D01F 6/06* (2013.01); *D01F 6/625* (2013.01); *B29C 64/393* (2017.08); *B29K 2067/046* (2013.01); *B29K 2401/00* (2013.01); *B29K 2423/12* (2013.01); *B29K 2995/0089* (2013.01); *B33Y 10/00* (2014.12); *B33Y 50/02* (2014.12); *B33Y 80/00* (2014.12); *C08L 2205/03* (2013.01)

(58) Field of Classification Search
CPC .... D01F 6/06; D01F 6/625; Y10T 428/31931; Y10T 428/21931; B29C 47/0014; B29C 64/393; B29C 64/118; C08L 97/02; C08L 23/10; C08L 1/02; C08L 67/04; B29K 2067/046; B29K 2401/00; B29K 2423/12
USPC .................................................. 428/297.4
See application file for complete search history.

(56) References Cited

FOREIGN PATENT DOCUMENTS

| WO | 2015069986 A1 | 5/2015 |
|---|---|---|
| WO | 2015168922 A1 | 11/2015 |

OTHER PUBLICATIONS

English language version of Patent Application for Chinese Publication No. 105585830(A); Date of Publication: May 18, 2016; Application No. 201610104381.7; Filing Date: Feb. 25, 2016, 18 Pages.

English language version of Patent Application for Chinese Publication No. 104356618(A); Date of Publication: Feb. 18, 2015; Application No. 201410587283A; Filing Date: Oct. 29, 2014; 9 Pages.

\* cited by examiner

COMPOSITE MATERIAL FOR ADDITIVE MANUFACTURING OF A THREE-DIMENSIONAL COMPOSITE PRODUCT

CROSS REFERENCE TO RELATED APPLICATIONS

The present application claims priority to EP Application No. 16397521.2, filed Jun. 17, 2016, which is incorporated herein in its entirety.

TECHNICAL FIELD

The invention relates to a composite material suitable for use in additive manufacturing by extrusion, a method for manufacturing a three-dimensional composite product with an additive manufacturing system from a filament of such composite material, and to a three-dimensional composite product obtained by an additive manufacturing system using such composite material.

BACKGROUND

Additive manufacturing as a technology refers to forming a solid object based on a model, as defined in standards ISO 17296-1 and ASTM 2792-12. Additive manufacturing is also known as augmented manufacturing, three dimensional printing, or 3D printing.

Thermoplastic material, typically polymer or composite material comprising matrix polymer, undergoes a transition from rigid state into a softer melt state, when heated to a temperature higher than the glass transition temperature or melt temperature of the material. Additive manufacturing by extrusion denotes a method comprising deposition of flowing thermoplastic material through a nozzle on a platform in a predefined manner to obtain a product according to a model. Hereafter, such a three-dimensional product is also referred to as a '3D printed product'. Additive manufacturing by extrusion differs from conventional extrusion and moulding methods, wherein a single shot of material is processed continuously into a specific shape. Typically, a mould or counter-pressure may be used to support the melt or semi-solid material, before it solidifies. An additive manufacturing by extrusion is performed without a mould. Hence, thermoplastic material used in additive manufacturing may require different characteristics than those used in conventional extrusion or moulding methods.

Material may be supplied to the additive manufacturing system in different forms, such as in a filament, powder, or granulate form. Typically, the additive manufacturing system has been configured to receive solid material in a specific form, such as in the form of a filament. Many extrusion methods, such as fused deposition modelling and fused filament fabrication, use material in a filament form. The shape and thermo-mechanical characteristics of the supplied material have an effect for the suitability of the material for additive manufacturing. Filament material pulled from a holder, also denoted as a spool, is a convenient way of providing material for an additive manufacturing system working on extrusion principle.

A filament for an additive manufacturing by extrusion may be formed of composite material comprising thermoplastic polymer as matrix material. Polylactic acid, hereafter abbreviated as PLA, may be used as matrix material in additive manufacturing by extrusion. PLA may be provided with rheological properties suitable for additive manufacturing by extrusion. PLA typically has good adhesion to a heated platform, such as glass bed, which is used in an extrusion-type additive manufacturing system to receive the melt.

One challenge of PLA in additive manufacturing by extrusion is, that the HDT and $T_g$ of the polymer is quite low, typically around 60° C. or even less. PLA has high stiffness in temperatures below the glass transition temperature. Therefore, a filament manufactured of PLA typically is relatively brittle and has a hard, glasslike surface. Especially when kept under tension for a prolonged time, such a filament may easily break and cause interruptions into the feeding of the filament to the additive manufacturing system. In particular, when the filament feeding speed is increased, a higher amount of force may be applied on the filament, thereby increasing the risk of feeding interruptions.

The processing temperature of PLA is typically quite high. The processing temperature of PLA may be in the range of 180 to 195° C. or even higher. A high difference between the processing temperature and the $T_g$ lead to slow cooling of melt formed from PLA. While semi-crystalline grades have a faster crystallization speed than amorphous grades of PLA, it is problematic that the PLA material in melt state may not hold the extruded shape sufficiently, before it has solidified. PLA has a relatively low melt viscosity, which may lead to messy print result in a situation where the printed material in the melt state does not stay in the extruded shape, but continues to flow and may collapse. This is particularly problematic when the dimensions of the nozzle increase and larger amounts of material are dispensed at a time.

Another aspect of additive manufacturing is, that the properties of the 3D printed product may differ from a conventionally produced extrusion product. A 3D printed product typically comprises multiple layers and adjacent rows of printed material. Depending of the printing speed and printing path, the mechanical properties of the formed 3D printed product may vary. When two adjacent rows or layers have been printed such that a subsequent row or layer is deposited as a melt either on top of or next to a solidified material layer, an interface is formed between the adhered layers. In such a situation, the material in melt state may not stop flowing in time from the nozzle. A material having low melt viscosity may be difficult to operate. This is the case in particular when the printing operation requires the production of discontinuous shapes, wherein the additive manufacturing system should leave empty space or gaps between deposited material portions or layers.

From the perspective of filament feeding, the composite material should be flexible and withstand tension. On the other hand, while being deposited from the additive manufacturing system, the composite material in melt form should allow precise portioning of the melt. It may therefore be difficult in additive manufacturing by extrusion to deposit a portion of the melt, such that each deposited portion of the composite melt may obtain a cross-dimensional shape corresponding to the dimensions of the nozzle hole.

Semi-crystalline polymers are difficult in additive manufacturing by extrusion, since semi-crystalline polymer chains cause the polymer material to shrink during cooling. Without a supporting mould, the shrinkage may lead to a 3D printed product not having sufficient dimensional precision for the end application purpose.

Hence, the characteristics of the material supplied to the additive manufacturing system may need to be considered also from the perspective of the additive manufacturing process and the formed 3D printed product.

Consequently, as described above, the properties of the material supplied to the additive manufacturing system has an effect both to the manufacturing method and the formed 3D printed product. Due to the problems described above, it may be difficult to obtain a three dimensional composite product by additive manufacturing, which would be sufficiently accurate reproduction of the model, in particular when the printing speed is increased.

SUMMARY

Some variations relate to a filament suitable for use in additive manufacturing. Some variations relate to a method for manufacturing a three-dimensional composite product according to a model with an additive manufacturing system. Some variations relate to a product obtainable according to such a method.

Additive manufacturing enables the production of relatively small series of products or even individual parts, typically with less investment spent in the manufacturing equipment. Additive manufacturing by extrusion may be used to produce decorative objects or functional parts for various applications. Additive manufacturing by extrusion can be used, for example, for rapid prototyping or to manufacture customized parts.

A filament formed of composite material may comprise semi-crystalline polylactic acid, wood based cellulose fibres and polypropylene homopolymer or copolymer. The amount of each component in the filament may be selected independently of each other.

According to an aspect, there is provided a filament suitable for use in additive manufacturing by extrusion, the filament formed of composite material comprising
  semi-crystalline polylactic acid and
  chemical pulp of wood-based cellulose fibres,
wherein the amount of chemical pulp of wood-based cellulose fibres has been selected such that the composite material of the filament, when in melt state, has a complex viscosity η* of equal to or higher than 10000 Pa·s when determined at 0.1 Hz frequency and at 180° C. temperature, such that upon additive manufacturing by extrusion, composite melt formed of the filament has a ratio of shear storage modulus to shear loss modulus G'/G" equal to or higher than 1.0 at a temperature $T_{sub}$ equal to or higher than 133° C., when determined at 1 Hz frequency. The temperature $T_{sub}$ is higher than the glass transition temperature $T_g$ of the semi-crystalline polylactic acid. The complex viscosity η* may be determined from a sample of the composite material with parallel plates geometry of 25 mm diameter and a gap of 0.6 mm, at 0.1% strain, by frequency sweep measurement at 0.1 Hz frequency, at a temperature of 180° C., in accordance with ISO standard 6721-10 (version 2015). The ratio of shear storage modulus to shear loss modulus G'/G" may be determined from a sample of the composite material with parallel plates geometry of 25 mm diameter and a gap of 0.6 mm, at 0.1% strain, at 1 Hz frequency, under temperature ramp having a linear rate of 5° C./min in a temperature range of 180° C. to 25° C., in accordance with ISO standard 6721-10 (version 2015).

According to another aspect, there is provided a method for manufacturing a three-dimensional composite product according to a model with an additive manufacturing system, the method comprising
  obtaining a model of a composite product on an additive manufacturing system, the model defining a shape of a three-dimensional composite product,
  supplying a filament comprising semi-crystalline polylactic acid polymer and chemical pulp of wood-based cellulose fibres to a heater unit on the additive manufacturing system, such that a part of the filament at a time is fed to the heater unit,
  heating each part of the filament fed to the heater unit to a processing temperature higher than the melting temperature of the semi crystalline polylactic acid, thereby forming portions of composite melt corresponding to the parts of the filament fed to the heater unit,
  dispensing a portion of the composite melt at a time from a nozzle having a width, and
  controlling the dispensing operation such that portions of the composite melt adhere together on a platform according to the model, thereby forming the three-dimensional composite product,
wherein the amount of chemical pulp of wood-based cellulose fibres in the filament has been selected such that the composite material of the filament, when in melt state, has a complex viscosity η* of equal to or higher than 10000 Pa·s when determined at 0.1 Hz frequency and at 180° C. temperature such that upon additive manufacturing by extrusion, composite melt formed of the filament has a ratio of shear storage modulus to shear loss modulus G'/G" equal to or higher than 1.0 at a temperature $T_{sub}$ equal to or higher than 133° C., when determined at 1 Hz frequency. The temperature $T_{sub}$ is higher than the glass transition temperature $T_g$ of the semi-crystalline polylactic acid. The complex viscosity η* may be determined from a sample of the composite material with parallel plates geometry of 25 mm diameter and a gap of 0.6 mm, at 0.1% strain, by frequency sweep measurement at 0.1 Hz frequency, at a temperature of 180° C., in accordance with ISO standard 6721-10 (version 2015). The ratio of shear storage modulus to shear loss modulus G'/G" may be determined from a sample of the composite material with parallel plates geometry of 25 mm diameter and a gap of 0.6 mm, at 0.1% strain, at 1 Hz frequency, under temperature ramp having a linear rate of 5° C./min in a temperature range of 180° C. to 25° C., in accordance with ISO standard 6721-10 (version 2015).

According to an aspect, a three-dimensional composite product according to a model is obtainable with an additive manufacturing system as disclosed above. The product may comprise a first impact strength in a first direction substantially parallel to a reference plane parallel to the layers of the three-dimensional product comprising layers, and a second impact strength in a second direction substantially perpendicular to the reference plane, wherein the first impact strength differs from the second impact strength, when determined as Charpy impact strength values at 23° C. according to standard ISO 179/1 eU.

The semi-crystalline polylactic acid has a low melt viscosity and may hence act as a Newtonian fluid when in melt state. A force, even gravitational force, applied on the semi-crystalline polylactic acid in a melt state may thereby cause the shape of a deposited portion of semi-crystalline polylactic acid melt to deform. The filament formed of composite material may comprise semi-crystalline polylactic acid in an amount of equal to or less than 90 wt. % of the weight of the filament. The filament formed of composite material may preferably comprise semi-crystalline polylactic acid in an amount of equal to or higher than 50 wt. %, such as in the range of 50 to 90 wt. % of the weight of the filament.

To overcome disadvantages of the semi-crystalline polylactic acid, the filament formed of composite material may comprise chemical pulp of wood-based cellulose fibres.

Chemical pulp of wood based cellulose fibres contains low amounts of lignin. Bleached chemical pulp in particular is essentially lignin free, having high brightness. In particular, chemical pulp comprises characteristics suitable for improving the rheological behaviour of a composite material comprising semi-crystalline polylactic acid.

The amount of chemical pulp of wood-based cellulose fibres has an effect on the complex viscosity η* of the composite material. The filament formed of composite material may comprise chemical pulp of wood based cellulose fibres in an amount of equal to or less than 30 wt. % of the weight of the filament. When arranging a composite melt to comprise polylactic acid and chemical pulp of wood-based cellulose fibres, the amount of chemical pulp of wood-based cellulose fibres may be selected to obtain a sufficiently high complex viscosity η* of the composite material. Hence, chemical pulp of wood-based cellulose fibres have the effect of increasing the viscoelastic properties of a composite melt comprising semi-crystalline polylactic acid and chemical pulp of wood-based cellulose fibres. Preferably the filament formed of composite material may comprise chemical pulp of wood-based cellulose fibres in an amount of equal to or higher than 5 wt. %, such as in the range of 5 to 30 wt. % of the weight of the filament.

Complex viscosity η*, also known as dynamic viscosity, is a measure of the minimum viscosity that a melt of a composite material achieves when cooling from a temperature above the glass transition temperature prior to commencing to solidify. Complex viscosity η* is obtained by dividing complex modulus G* with angular frequency. Complex modulus G* is measured by means of oscillation rheology techniques. Angular frequency refers to the oscillation frequency measured in radians per second. Angular frequency can be used instead of frequency in Hertz. Complex viscosity G* values are typically given in units of pascal-second, abbreviated as Pa·s.

The complex modulus G* is also known as dynamic modulus, and may be expressed according to equation 1:

$$G^* = G' + iG'' \quad \text{(Equation 1)}$$

wherein G' represents the shear storage modulus, G'' represents the shear loss modulus and i represents an imaginary unit.

Complex modulus is a ratio of stress to strain under vibratory conditions. Complex modulus is a property of viscoelastic materials. It quantifies the rigidity of material when exposed to a stress below the yield stress. Complex modulus indicates the flexibility or stiffness of material. Complex modulus may be determined by oscillation rheology measurements. The complex modulus thus represents overall resistance of a material to deformation, regardless of whether that deformation is elastic and therefore recoverable or viscous and therefore non-recoverable. The material therefore resists deformation upon cooling from melt state. Hence, a portion of composite melt, once dispensed from the nozzle of an additive manufacturing system, solidifies into shape with precision sufficient to enable formation of a three-dimensional composite product according to a model.

The rheological properties of the filament material may further be described by the shear storage modulus and shear loss modulus. Shear storage modulus, denoted as G', measures the stored energy within the material. Shear storage modulus thus represents the elastic portion. Shear loss modulus, denoted as G'', measures the energy dissipated as heat. Shear loss modulus represents the viscous portion. In a situation above the glass transition temperature of the matrix material, such as polylactic acid, where G' is larger than G'', the material has capacity to store energy and may return to its initial configuration, when a mechanical force is applied on the material. The material thus has elastic behaviour. In a situation where G'' is larger than G', a mechanical force applied on the material causes the internal structure of the material to collapse, such that the material flows. The amount of chemical pulp of wood-based cellulose fibres may be selected such that the composite material of the filament, in a situation where $T_{sub} > T_g$, has a sufficient complex viscosity η*, such that upon additive manufacturing by extrusion, composite melt formed of the filament has a ratio of shear storage modulus to shear loss modulus G'/G'' equal to or higher than 1.0. Preferably, a filament containing polylactic acid and chemical pulp of wood-based cellulose fibers has the ratio of shear storage modulus to shear loss modulus G'/G'' equal to or higher than 1.0 at a temperature $T_{sub}$ equal to or higher than 133° C., wherein $T_{sub} > T_g$, and where the composite melt begins to support its own weight, upon cooling. A composite melt comprising semi-crystalline polylactic acid and wood based cellulose fibres is shear-thinning. The shear storage modulus G', the shear loss modulus G'' and the cross-over point G'/G''=1 may be determined from a sample of the composite material with parallel plates geometry of 25 mm diameter and a gap of 0.6 mm, at 0.1% strain, at 1 Hz frequency, under temperature ramp having a linear rate of 5° C./min in a temperature range of 180° C. to 25° C., in accordance with ISO standard 6721-10 (version 2015).

The filament formed of composite material may further comprise polypropylene. The polypropylene may be elastomer modified polypropylene homopolymer or copolymer. The filament formed of composite material may comprise polypropylene homopolymer or copolymer in an amount of equal to or less than 30 wt. %, preferably equal to or less than 20 wt. %, of the weight of the filament. Polypropylene typically has a higher melt viscosity than polylactic acid. The heat deflection temperature of the polypropylene homopolymer or copolymer may be higher that the heat deflection temperature of the semi-crystalline polylactic acid. The heat deflection temperature of the polypropylene homopolymer or copolymer may be equal to or higher than 80° C., when determined under constant flexural stress of 0.45 Mpa, in accordance with method B of the standard ISO 75-2 (version 2013). Preferably the filament formed of composite material may comprise polypropylene homopolymer or copolymer in an amount of equal to or higher than 5 wt. %, such as in the range of 5 to 20 wt. % of the weight of the filament. Polypropylene may be arranged to increase the ratio of the shear loss modulus to the shear storage modulus of a composite material in an additive manufacturing method by extrusion. A filament containing polypropylene, polylactic acid and chemical pulp of wood-based cellulose fibers may be configured to have G''>G' at a higher temperature. A filament containing polylactic acid and chemical pulp of wood-based cellulose fibers may be arranged to have a cross-over point wherein G'/G''=1 at a temperature equal to or higher than 133° C. A filament containing polypropylene, polylactic acid and chemical pulp of wood-based cellulose fibers may be arranged to have a cross-over point wherein G'/G''=1 at a temperature equal to or higher than 140° C., such as at a temperature equal to or higher than 145° C. Polypropylene may therefore be arranged to shift the temperature, where the composite melt begins to support its own weight, upon cooling. Such composite melt is more elastic, when the composite melt is cooled down. Hence, a filament for additive manufacturing containing polypropylene, polylactic acid and wood-based cellulose fibres is less sensitive to cooling, and has improved dimensional stability. The behaviour of composite melt upon cooling is of importance in additive manufacturing by extrusion, as the product may contain multiple layers and is formed from the composite melt without a supporting mould.

Advantageously, the filament is formed of composite material wherein the material components are of non-recycled material. Each material component may be non-recycled material, independently of each other. A non-recycled polymer material in this context refers to virgin polymer material, such as polylactic acid and/or polypropylene. A non-recycled fibre material in this context refers to freshly manufactured chemical pulp of wood-based cellulose fibres from a pulp mill. Non-recycled material typically has higher grade of purity than recycled material.

To reduce deformation of the extruded composite portions upon cooling, the manufacturing speed in additive manufacturing by extrusion is typically maintained relatively slow. Traditionally, it has been particularly challenging to increase the manufacturing speed of the additive manufacturing system, due to the cooling behaviour of the melted material. Semi-crystalline polymers, such as polypropylene or polyethylene, have been particularly difficult in additive manufacturing by extrusion, since semi-crystalline polymer chains cause the polymer material to shrink during cooling. Shrinkage refers to the dimensional reductions of the material upon cooling and solidification from melt state. Polypropylene, in particular, has a tendency to shrink. In addition, polypropylene is non-polar and exhibits low surface free energy, typically in the range of 30 mN/m or below at 20° C. The low surface free energy may cause a polymer melt made of polypropylene difficult to adhere to the platform.

The shrinkage is related to the processing temperature of the polymer melt, such that a higher processing temperature requires that the polymer melt has to cool down more before becoming solid. A high temperature difference between the processing temperature and the melting temperature may therefore increase the shrinkage. With semi-crystalline polymers also the glass transition temperature, hereafter referred to as $T_g$, is of significance. In semi-crystalline material, glass transition refers to a reversible transition within amorphous regions of the material, wherein the polymer is transformed from a hard and relatively brittle state into a molten or rubber-like state, as the temperature is increased. Crystallization occurs upon cooling from melt, when the temperature of the semi-crystalline material in a melt state decreases and approaches the heat deflection temperature or the glass transition temperature of the material. Depending of the degree of crystallization, the state transformation from melt to solid may be uneven. When the polymer chains rearrange rapidly, the material may shrink.

When the composite melt has a sufficiently high complex viscosity $\eta^*$, upon additive manufacturing by extrusion, the composite melt formed of the filament is able to resist deformation at an elevated temperature $T_{sub}$. A composite material comprising wood-based cellulose fibre and polypropylene may thus be configured to further reduce the shrinkage tendency of the composite material. The chemical pulp of wood-based cellulose fiber may be arranged to act as a nucleating agent promoting heterogeneous nucleation of semi-crystalline polymer, such as the polylactic acid and/or polypropylene in the matrix material. A composite material comprising wood-based cellulose fibre and semi-crystalline polymer, such as the polylactic acid and/or polypropylene, may hence be arranged to provide filament, which has a faster rate of crystallization. The composite material may thus be arranged to have a dimensional moulding shrinkage of less than 1.15% upon solidification from melt, when determined in a situation where a rectangular mould plate having a temperature of 70° C. and dimensions of 60 mm×60 mm×2 mm is filled with the composite melt having an initial temperature of 195° C., in accordance with standard ISO 294-4 (version 2011).

The above-described characteristic of polypropylene, while challenging for additive manufacturing, may be further be arranged to improve the flexural modulus of the filament material, such that the filament has higher flexibility and surface softness. A composite material comprising copolymer of propylene and ethylene monomers may in particular be configured to increase the toughness and flexibility of the filament.

The compatibility of the hydrophobic polypropylene towards the hydrophilic wood based cellulose fibers may be improved by maleic acid grafted polypropylene. The composite material may comprise maleic acid grafted polypropylene homopolymer or copolymer, for example, at least 1%, such as in the range of 1-5%, preferably in an amount of equal to or less than 3 wt. % of the weight of the filament.

The fiber length, lignin content and bulk density of the wood-based cellulose fibre may further be selected to provide material with high specific modulus, thereby improving the stiffness-driven formation of a 3D printed product without a supporting mould. The filament formed of composite material may be arranged to have a flexural modulus equal to or less than 6 GPa, when measured by three-point loading test at a rate of 2 mm/min, in accordance with method B of the standard ISO 178 (version 2015), and a specific modulus higher than 2 $GPa/g/cm^3$, advantageously higher than 3 $GPa/g/cm^3$, most advantageously equal to or higher than 4 $GPa/g/cm^3$.

Chemical pulp of wood-based cellulose fibres having a low lignin content, such as equal to or less than 2.0%, preferably equal to or less than 0.5% of the weight of the chemical pulp, may be further be arranged to increase the processing temperature of the composite material. A filament formed of composite material wherein the wood-based cellulose fibre is chemical pulp having a low lignin and hemicellulose content may be arranged to provide a 3D printed composite surface having less hue and saturation. Such composite surface is visually perceived as a surface having lighter colour. Fiber material having high brightness, such as bleached chemical pulp, may further be used to provide filament with a desired specific colour, as the material may be easily dyed.

Advantageously, a filament formed of composite material may comprise
 semi-crystalline polylactic acid in an amount of equal to or less than 90 wt. %, preferably in the range of 50-90 wt. % of the weight of the filament,
 chemical pulp of wood-based cellulose fibres in an amount of equal to or less than 30 wt. %, preferably in the range of 5 to 30 wt. % of the weight of the filament, and
 polypropylene homopolymer or copolymer in an amount of equal to or less than 30 wt. %, preferably in the range of 5-20 wt. % of the weight of the filament.

Advantageously, a filament formed of composite material may comprise
 semi-crystalline polylactic acid in an amount in the range of 50 to 70 wt. % of the weight of the filament, chemical pulp of wood-based cellulose fibres in an amount of equal to or less than 20 wt. % of the weight of the filament, polypropylene homopolymer or copolymer in an amount of equal to or less than 20 wt. % of the weight of the filament, and maleic acid grafted polypropylene homopolymer or copolymer in an amount of equal to or less than 5 wt. % of the weight of the filament, such that the total amount of the components equals to 100 wt. % of the weight of the filament.

A more detailed description will be presented below, by referring to FIGS. 1-8, which illustrate various aspects of the invention. In the Figures, $S_X$, $S_Y$ and $S_Z$ denote orthogonal directions.

DETAILED DESCRIPTION

Figure 1:
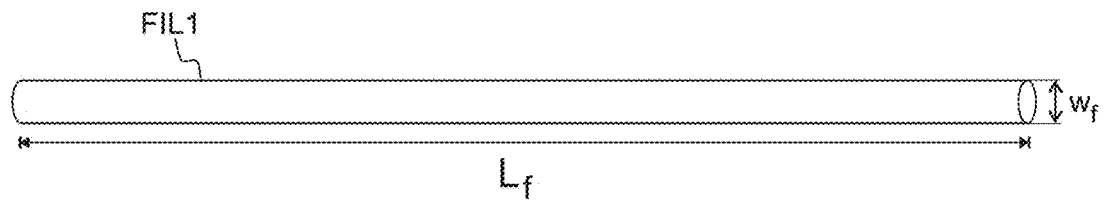
FIG. 1 illustrates, by way of an example, a filament suitable for use in additive manufacturing by extrusion, formed of composite material.
Figure 2:
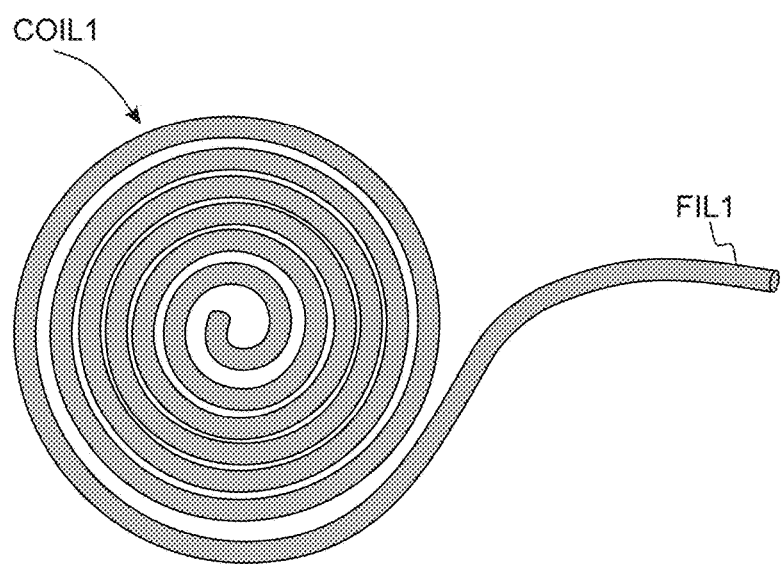
FIG. 2 illustrates, by way of an example, a filament winded on a holder suitable for feeding the filament into additive manufacturing system, wherein the filament has been bent around the holder.
Figure 3:
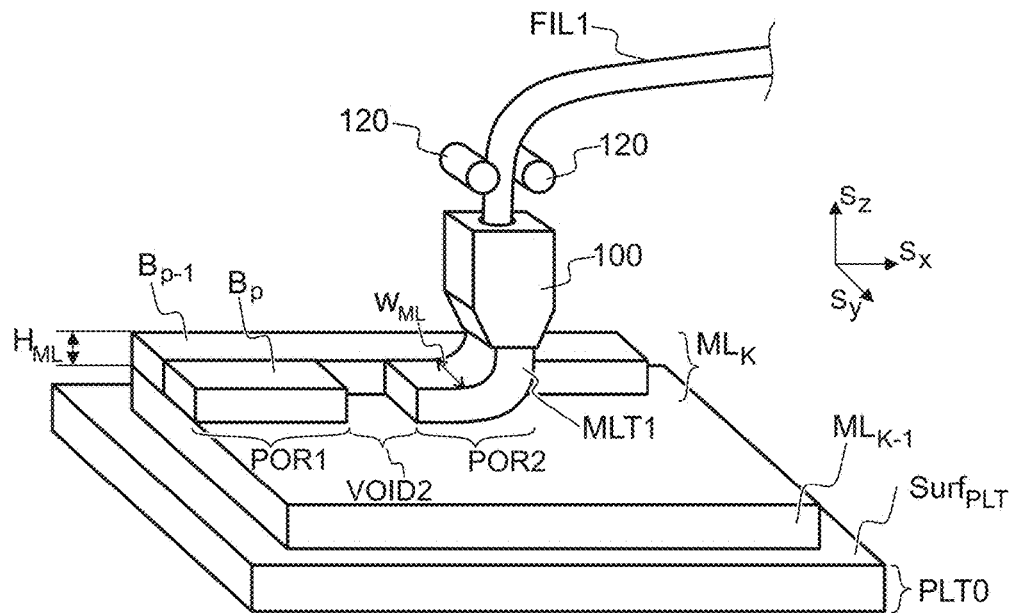
FIG. 3 illustrates, by way of an example, a three-dimensional view of a method for manufacturing a three-dimensional composite product with an additive manufacturing system, wherein filament is being fed to a heater unit of an additive manufacturing system, and wherein portions of composite melt corresponding to the parts of the filament are dispensed in a controlled manner on a platform, thereby producing composite elements adhered to each other and forming the three-dimensional composite product.
Figure 4:
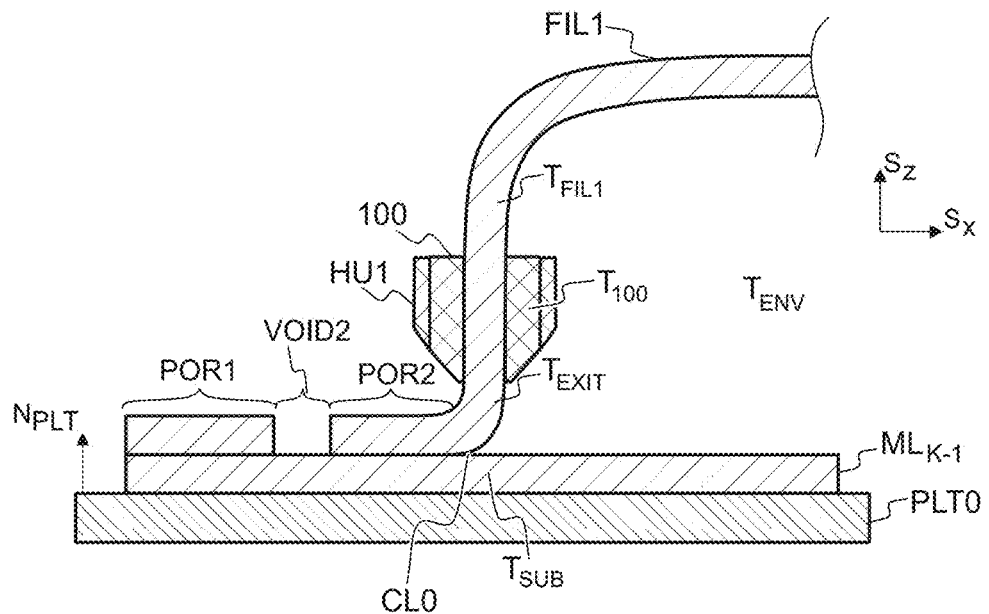
FIG. 4 illustrates, by way of an example, a cross-sectional view of the method for manufacturing a three-dimensional composite product, as disclosed with respect to FIG. 3, further indicating temperatures.
Figure 5:
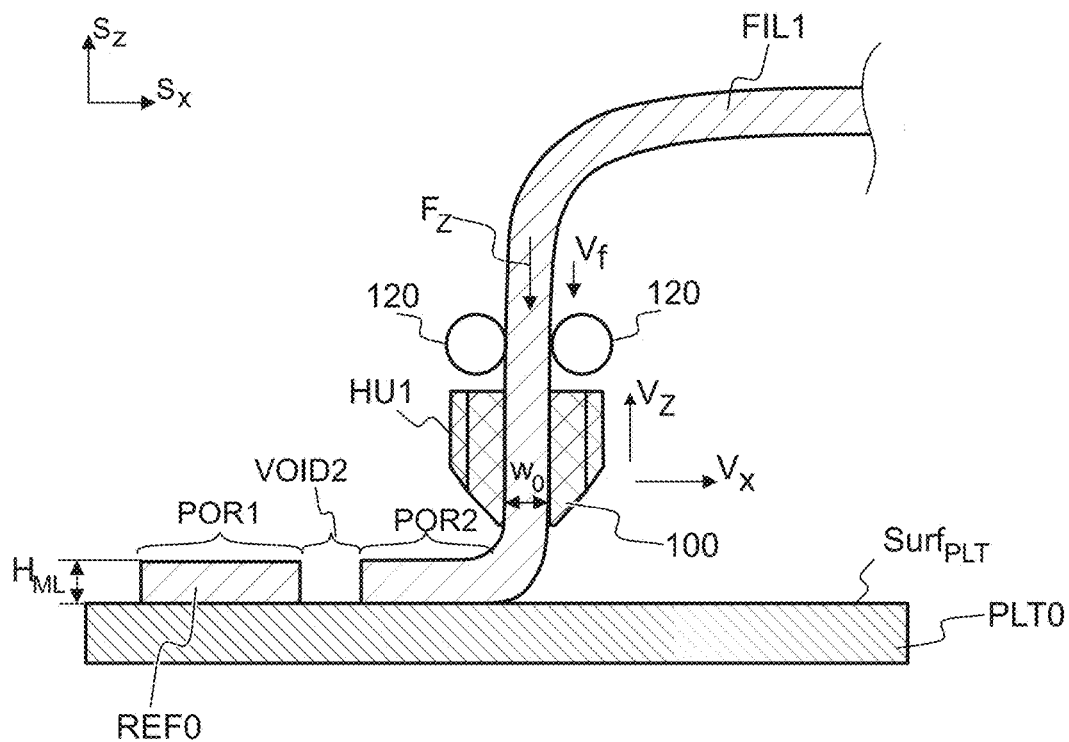
FIG. 5 illustrates, by way of an example, a cross-sectional view of the method for manufacturing a three-dimensional composite product, as disclosed with respect to FIGS. 3 and 4, further indicating motion and forces.
Figure 6:
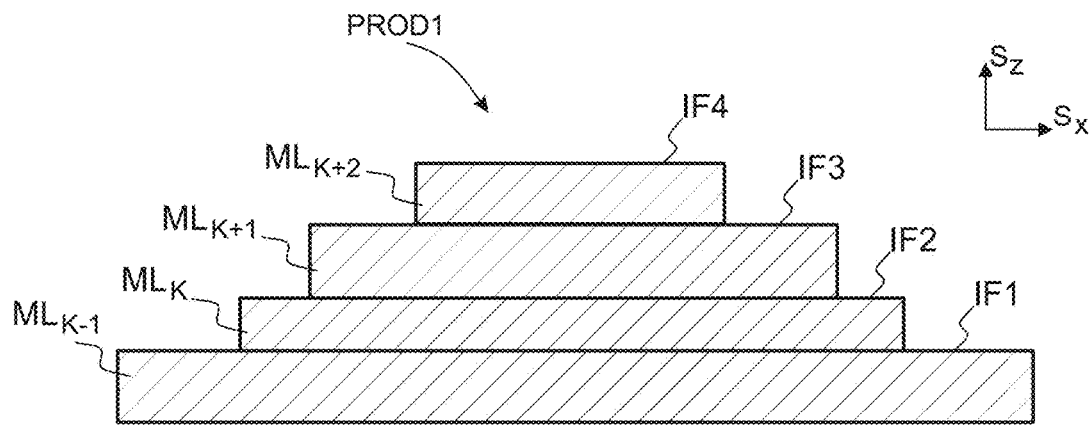
FIG. 6 illustrates, by way of an example, a cross-sectional view of a three-dimensional composite product obtainable with an additive manufacturing system, the three-dimensional composite product having layers adhered to each other.

Referring to FIGS. 1 and 2. Additive manufacturing by extrusion may use filament material, such as in fused deposition modelling and fused filament fabrication. A filament FIL1 in this context refers to article formed of composite material, wherein the composite material comprises wood-based cellulose fibres and matrix material, such as polylactic acid. The matrix material may further contain other polymers, such as polypropylene. The filament FIL1 may be winded on a holder COIL1, such that the filament is bent in the form of a coil. The holder COIL1 may be configured to rotate, such that when a pulling force is applied on the winded filament FIL1, the filament may be extracted towards the source of the pulling force. The holder COIL1 may be configured to store the filament prior to use in an additive manufacturing system. The filament FIL1 may have a shape ratio $L_f/W_f$ equal to or higher than 100, preferably equal to or higher than 250. The shape ratio $L_f/W_f$ refers to the ratio of length to diameter, measured as the filament length $L_f$ to the filament maximum cross-sectional dimension $W_f$ perpendicular to the filament length $L_f$. When the cross-sectional dimension $W_f$ perpendicular to the filament length $L_f$ is round, the maximum cross-sectional dimension $W_f$ is the diameter of the filament. The filament may be configured to have a maximum cross-sectional width $W_f$ equal to or less than 5 mm, preferably equal to or less than 3 mm diameter, such as in the range of 1 to 5 mm. Diameters of 1.75 mm and 2.85 mm are two common diameters used in filaments for additive manufacturing by extrusion.

A Method for Manufacturing a Three-Dimensional Composite Product with an Additive Manufacturing System Referring to FIGS. 3 to 6. Additive manufacturing by extrusion is based on forming a solid object by means of a model, without a mould supporting the extruded material. Thus, the method comprises obtaining a model of a composite product PROD1. The model is used for defining a shape of the three-dimensional composite product PROD1 to be formed. Typically, the model is a digital model, such as a digital information stored in a computer file format. The model may contain position information of the solid object to be manufactured. The position information can be used to control the operation of the platform PLT0 and the nozzle 100 in the additive manufacturing system, such as a 3D printer. The model may, for example, contain a three dimensional information of coordinate pixels with respect to each other, thereby providing a three dimensional map of pixels.

An additive manufacturing system suitable for extrusion typically comprises a heated extruder head comprising a nozzle 100 for depositing the composite melt MLT1, and a platform PLT0 for receiving the deposited melt. The nozzle 100 and/or the platform PLT0 can be configured to move on multiple axes, such that the relative position of the nozzle 100 with respect to the platform PLT0 can be controlled in three directions $S_x$, $S_y$, $S_z$. The model may be used to control the movement of the platform PLT0 and/or the nozzle 100 with respect to each other, such that successive portions of composite melt MLT1 formed of the filament FIL1 may be dispensed on the platform in a predefined manner. By controlling the deposition of the composite melt MLT1 and the movement of the platform PLT0 and/or the nozzle 100 with respect to each other, successive portions of the composite melt MLT1 may be extruded on the platform PLT0 in a predefined manner. The additive manufacturing system may be configured to control feeding of the thermoplastic material and deposition of the melt in a layer-wise manner.

Additive manufacturing system may be divided into a feeding section and melt dispensing section. The feeding section of an additive manufacturing system typically has a cold end and a hot end. The cold end processes composite material in solid form. The hot end processes solid composite material into melt form. An additive manufacturing system may contain a holder COIL1 containing filament FIL1. The cold end of the additive manufacturing system may comprise supplying means 120 for pulling the filament FIL1 from the holder COIL1. The supplying means 120 are configured to guide the filament FIL1 to a heater unit HU1, located on the hot end of the additive manufacturing system. The supplying means 120 may be configured to feed the filament FIL1 to a heater unit HU1. A control unit may be configured to control the feeding velocity $V_f$ of the filament FIL1 to the heater unit HU1. The supplying means 120 may be arranged to supply the filament FIL1 to the heater unit HU1 with a pulling force $F_Z$, wherein the pulling force $F_Z$ is less than the tensile strength at break of the filament FIL1. The pulling force $F_Z$ correlates with a feeding velocity $V_f$, such that a larger pulling force $F_Z$ provides a higher feeding velocity $V_f$. The supplying means 120 may comprise, for example rolls and a stepper motor arranged to guide the rolls. A control unit may be configured to control the supply of the filament FIL1 to the heater unit HU1. The feeding velocity $V_f$ may be, for example, in the range of 10 to 100 mm/second, preferably in the range of 10 to 70 mm/second.

The additive manufacturing system may comprise temperature controlling means, such as a temperature sensors located at a heater unit HU1. A control unit may be configured to receive temperature information from the temperature sensors. The heater unit HU1 may comprise, for example, a heater and thermocouples. The heater unit HU1 may be coupled to a nozzle 100, such that the nozzle may be heated to a temperature $T_{100}$ equal to or higher than the processing temperature $T_{EXIT}$ of the filament FIL1. The control unit may be further connected to the supplying means 120, such that the feeding velocity $V_f$ can be synchronized with the nozzle temperature $T_{100}$. Thereby the heater unit HU1 may be arranged to have sufficient time to heat each part of the filament FIL1 fed to the heater unit HU1 to the processing temperature $T_{EXIT}$.

The processing temperature $T_{EXIT}$ depends of the filament FIL1 material composition. For example, when a filament FIL1 is formed of composite material having a higher melting point or glass transition temperature, a higher processing temperature $T_{EXIT}$, may be needed. Subsequently, the feeding velocity $V_f$ may be smaller, such that the heater unit HU1 has sufficient time to heat the solid filament FIL1 having an initial filament temperature $T_{FIL1}$ to the processing temperature $T_{EXIT}$. The initial filament temperature $T_{FIL1}$ is less than the melting temperature $T_m$ or the heat deflection temperature of the composite material of filament FIL1. The heater unit HU1 may therefore be configured to heat each part of the filament FIL1 fed to the heater unit HU1 to a processing temperature $T_{EXIT}$. When the matrix material is semi crystalline polylactic acid, the heater unit HU1 may heat each part of the filament FIL1 fed to the heater unit HU1 to a processing temperature $T_{EXIT}$ higher than the melting temperature $T_m$ of the semi crystalline polylactic acid, thereby forming portions of composite melt. The processing temperature $T_{exit}$ of the filament FIL1 may be, for example above 160° C. When the filament FIL1 comprises chemical pulp of wood-based cellulose fibers wherein the lignin content of the chemical pulp is low, the processing temperature may be above 180° C., such as in the range of 180 to 230° C. Typically the processing temperature $T_{exit}$ is equal to or below 230° C., wherein the cellulose fiber begins to decompose.

When the filament FIL1 is heated to the processing temperature $T_{EXIT}$ higher than the glass transition temperature $T_m$ of the matrix material, the filament FIL1 softens. Thus, at a processing temperature $T_{EXIT}$, the composite material flows. The flow rate of the material may be determined by the melt mass-flow index. The heating unit HU1 thereby provides composite melt MLT1 having a processing temperature $T_{EXIT}$, formed of the filament FIL1.

The composite melt MLT1 may be extruded through the nozzle 100. The nozzle 100 may comprise a through-put hole for extruding the composite melt MLT1. The dimensions of the hole of the nozzle 100 may be smaller than the dimensions of the filament FIL1. Typically, the hole is round. The dimensions of the hole have an effect on the rate of extrusion. A nozzle 100 having a hole with a larger diameter $w_0$ allows higher dispensing velocity of the composite melt MLT1. Hence, a nozzle 100 having a hole with a larger diameter $w_0$ may allow higher feeding velocity $V_f$ of the filament FIL1. The diameter $w_0$ of the hole may be, for example, in the range of 0.2 mm to 1.0 mm. Typical diameters $w_0$ of the hole are, for example 0.25 mm, 0.4 mm and 0.6 mm.

The through-put hole of the nozzle 100 may have a hole width $W_0$. The hole width $W_0$ defines the maximum width of the composite melt MLT1, which may be extruded through the nozzle 100. The width of the composite melt MLT1 extruded through the nozzle 100 may be equal to the width $W_{ML}$ of the composite element POR1, POR2 formed of the composite melt MLT1 upon cooling. The incoming filament FIL1, still in solid phase, may be used to provide a pushing force to the composite melt MLT1. The pushing force may correlate with the pulling force $F_Z$. The incoming filament FIL1 may thus act as a piston or plunger suitable for dispensing the composite melt. The dispensing velocity of the composite melt MLT1 may therefore be controlled, to some extent, by means of the feeding velocity $V_f$ of the filament FIL1.

The additive manufacturing system may comprise a control unit for controlling the feeding velocity $V_f$ and/or the lateral movement $V_x$ of the nozzle 100 and/or the platform PLT0. The method may comprise dispensing a portion of the composite melt MLT1 at a time from the nozzle 100. A contact line CL0 defines a position on the platform PLT0 in planar directions $S_x$, $S_y$, wherein the composite melt MLT1 flowing from the nozzle 100 contacts the platform PLT0. When a subsequent material layer $ML_K$ is formed on top of a previously dispensed material layer $ML_{K-1}$ in direction $S_z$, the contact line CL0 defines the position, wherein the composite melt MLT1 flowing from the nozzle 100 contacts the previously deposited material layer $ML_{K-1}$.

The platform PLT0 and/or the nozzle 100 may be configured to move on orthogonal directions $S_x$, $S_y$, $S_z$, independently of each other. After exiting the nozzle 100, the dispensed portions of the composite melt MLT1 begin to cool down. Upon contacting the platform PLT0 at the contact line CL0, each dispensed portion of the composite melt MLT is converted into a composite element POR1, POR2. Upon coming into contact with the platform PLT0 or another portion of the composite melt MLT1, each dispensed portion of the composite melt adheres and is converted into a composite element POR1, POR2 having a thickness $H_{ML}$ and a width $W_{ML}$.

By controlling the movement of the platform PLT0 and/or the nozzle, the composite elements POR1, POR2 may be arranged to form blocks $B_{p-1}$, $B_p$ of composite material. A block $B_{p-1}$ of composite material may be formed by dispensing a continuous flow of composite melt MLT1, for example in direction $S_x$. Alternatively, a block $B_p$ of composite material may be formed of multiple portions by dispensing a non-continuous flow of the composite melt MLT1, for example in direction $S_x$. The composite elements POR1, POR2 may therefore be separated by a gap VOID2, such that empty space separates two composite elements POR1, POR2 apart from each other. Blocks $B_{p-1}$, $B_p$ of composite material composite elements POR1, POR2 deposited in a same planar plane in directions $S_x$, $S_y$ form a material layer $ML_K$, $ML_{K-1}$. Hence, by controlling the feeding velocity $V_f$ and/or the lateral movement $V_x$ of the nozzle 100 and/or the platform PLT0 according to the model, such that composite elements POR1, POR2 adhere to each other in a plane parallel to the platform surface $SURF_{PLT}$, a material layer $ML_K$ may be produced. When composite elements POR1, POR2 adhere on the platform PLT0 in a plane parallel to the platform surface $Surf_{PLT}$, a first material layer $ML_{K-1}$ is produced. By controlling the feeding velocity $V_f$ and/or the vertical movement $V_z$ of the nozzle 100 and/or the platform PLT0 according to the model, such that subsequent material layers $ML_K$, $ML_{K+1}$ adhere to each other in direction $S_z$ substantially parallel to the normal of the platform surface $N_{PLT}$, a three-dimensional product PROD1 having layers $ML_{K-1}$, $ML_K$, $ML_{K+1}$ may be produced. The formed product may thus contain multiple layers $ML_{K-1}$, $ML_K$, $ML_{K+1}$, $ML_{K+2}$ arranged on top of each other, wherein the layers $ML_{K-1}$, $ML_K$, $ML_{K+1}$, $ML_{K+2}$ have adhered to each other. The formed product may contain interfaces IF1, IF2, IF3 between the layers. Each formed layer $ML_{K+2}$ may serve as a base for a further interface IF4. By controlling the deposition of multiple material layers $ML_{K-1}$, $ML_K$, $ML_{K+1}$, $ML_{K+2}$ adhered to each other, a three dimensional shape according to a model may be obtained. Upon cooling, the successively extruded portions of the composite melt MLT1 thus form the three-dimensional composite product PROD1.

Filament Composition—Thermomechanical Aspects

The conversion of a composite melt MLT1 into a composite element POR1, POR2 is a temperature-driven process. The melt flow index, cooling and rheological properties during cooling of the composite melt extruded from the additive manufacturing system may be used to provide a three-dimensional product PROD1 comprising gaps VOID2 between the dispensed composite elements POR1, POR2. The melt mass-flow index of the filament formed of a composite material may be selected to improve the self-supporting structure of the composite melt MLT1, when the temperature of the composite element POR1, POR2 is equal to or higher than the cross-over temperature $T_{sub}$. The melt flow index of composite material correlates inversely with the self-supporting structure of the composite melt MLT1. Hence, a composite material having relatively low melt flow index has improved dimensional stability in melt state. The melt mass-flow index of a composite material may be reduced by increasing the amount of chemical pulp of wood-based cellulose fiber in the composition. The melt behaviour of the composite melt extruded from the additive manufacturing system may further be controlled by the Rheological properties of the filament FIL1. A filament FIL1 formed of composite material having small temperature difference between the cross-over temperature $T_{sub}$ and the processing temperature $T_{EXIT}$ may be used to provide composite melt MLT1 for additive manufacturing method, wherein dispensed portions of composite melt MLT1 are converted into composite elements POR1, POR2 having a thickness $H_{ML}$ and a width $H_{ML}$, corresponding to the dimensions of the nozzle 100. When exiting the nozzle 100, the composite material has a temperature which is close to the processing temperature $T_{EXIT}$. The additive manufacturing system is typically located in an environment having a temperature $T_{ENV}$. The environment temperature $T_{ENV}$ is less than the heat deflection temperature of the composite material. The environment temperature $T_{ENV}$ may vary. The environment temperature $T_{ENV}$ may be, for example, in the range of 20 to 35° C. Rheological properties of the filament FIL1 may be used to improve the dimensional stability of the composite melt formed of the filament FIL1. The filament FIL1 formed of composite material has a cross-over temperature $T_{sub}$. The cross-over temperature $T_{sub}$ relates to the melt rheology of the filament material. The cross-over temperature $T_{sub}$ denotes the temperature, wherein the amount of shear storage modulus G' is equal to the amount of shear loss modulus G" of the composite material. The cross-over temperature $T_{sub}$ depends on the composition of the filament FIL1. When the temperature of the composite element POR1, POR2 is equal to or less than the cross-over temperature $T_{sub}$, the composite element POR1, POR2 has sufficient dimensional stability such that it is capable to support its own weight. In other words, when the temperature of the composite element POR1, POR2 is equal to or less than the cross-over temperature $T_{sub}$, the composite element POR1, POR2 is capable to act as a base for another portion of the composite melt MLT1, without deformation. Advantageously, the cross-over temperature $T_{sub}$, is close to the processing temperature $T_{EXIT}$, such that $T_{sub} \leq T_{EXIT}$. The temperature difference between the cross-over temperature $T_{sub}$ and the processing temperature $T_{EXIT}$ has an effect on the cooling rate of the composite melt. The cross-over temperature $T_{sub}$, is higher than the glass transition temperature $T_g$, such that $T_g \leq T_{sub} \leq T_{EXIT}$. A filament FIL1 formed of composite material having small temperature difference between the cross-over temperature $T_{sub}$ and the processing temperature $T_{EXIT}$ is less sensitive to cooling. The temperature difference between the cross-over temperature $T_{sub}$ and the processing temperature $T_{EXIT}$ may be, for example, less than 100° C., preferably less than 80° C., most preferably less than 40° C., such as in the range of 5 to 40° C.

Filament Composition—Wood-Based Cellulose Fibres

The filament FIL1 may contain wood based cellulose fibres, which refer to cellulose fibres that originate from wooden material. Preferably, the filament FIL1 may contain chemical pulp of wood based fibres in an amount of equal to or less than 30 wt. %, such as in the range of 5 to 30 wt. % of the weight of the filament FIL1. The wooden material can be from softwood trees, such as spruce, pine, fir, larch, douglas-fir or hemlock, or from hardwood trees, such as birch, aspen, poplar, alder, eucalyptus, or acacia, or from a mixture of softwoods and hardwoods. Wood based cellulose fibres may comprise mechanically treated and/or chemically treated fibers and/or fiber-like particles.

Wood based cellulose fibres, which have undergone a chemical pulping process, are hereafter referred to as chemical pulp of wood-based cellulose fibres. The chemical pulp may be, for example, from kraft process or sulfite process, but also other chemical processes may be used, such as a soda pulping process. Kraft process is the most widely used cooking method in the pulp industry and chemical pulp from a Kraft process is available in large amounts. Lignin content of the chemical pulp is typically low, such as in the range of 0.01-15.00 wt-% of the weight of the chemical pulp. Typically, the chemical pulp may have a lignin content equal to or less than 10%, such as less than 5% or less than 2% of the weight of the chemical pulp. In applications wherein essentially lignin free chemical pulp is desired, the lignin content of the chemical pulp may be even lower, such as less than 1% or less than 0.5%, such as in the range of 0.01-1.00 wt-%, preferably in the range of 0.01-0.50 wt-% of the weight of the chemical pulp. Lignin is a highly polymeric macromolecule, which is naturally present in wood. Many softwood species, such as coniferous trees, contain large amounts of lignin. Lignin is able to crosslink and may act as a water repellent for wood based cellulose fibres. For example in wood cells, the presence of lignin limits the penetration of water into the wood cells and makes the structure very tight. Lignin is physically and thermally less durable than cellulose fiber. Wood based cellulose fibres comprising lignin are thus prone to decompose more easily at relatively low temperatures. Lignin may start to decompose already in a temperature below 160° C., which is considerably lower than a temperature where wood based cellulose fibres essentially free of lignin start to decompose. Furthermore, the decomposition of lignin may generate derivatives with odours. Depending of the end use, the presence of odours in a composite product may be undesired.

A relatively small average fiber length of the chemical pulp of wood-based cellulose fibres may provide characteristics suitable for improving the rheological behaviour of a composite material comprising semi-crystalline polylactic acid. The fiber length of the chemical pulp of wood-based cellulose fibres may further have an effect on the complex viscosity $\eta^*$ of the composite material. Preferably, the composite material may be arranged to comprise chemical pulp of wood-based cellulose fibres, wherein at least 70%, at least 80% or at least 90% by weight of the chemical pulp of wood-based cellulose fibres may have a length weighted fiber length of equal to or less than 0.4 mm, more preferably equal to or less than 0.25 mm, most preferably equal to or less than 0.1 mm. For example, at least 70%, at least 80%, or at least 90% by weight of the chemical pulp of wood-based cellulose fibres may have a length weighted fiber length in the range of 0.1 mm to 0.4 mm.

Chemically treated fibers and fiber-like particles may further comprise a cavity or a hollow interior. Due to the reduced lignin content, as well as the hollow interior, the chemically treated fibers, such as chemical pulp, may therefore have a density which is less that the density of fibers, wherein the lignin content has not been decreased, such as pulp treated mainly by mechanical methods. A chemically treated fiber may have an elongated shape comprising a length in a principal direction $S_x$, such that the cavity or a hollow interior extends parallel to the principal direction $S_x$. Chemically treated fiber-like particles may have a flattened shape, in the form of a flake, with a horizontal dimension comprising a major axis and a minor axis, which determining the width and length of the fiber-like particle and a vertical dimension determining the height of the fiber-like particle, such that the cavity or a hollow interior extends parallel to the principal direction $S_x$. The cavity or hollow interior of the chemically treated fibers or fiber-like particles may be used to reduce the density of the wood-based cellulose fiber in a composite material.

Hence, chemical pulp may be arranged to have a low lignin content and a hollow interior, such that the wood-based cellulose fiber has reduced density and may be processed in a higher processing temperature, for example, in the range of 160 to 230° C.

Filament Composition—Polylactic Acid

The filament FIL1 may contain semi-crystalline polymer, such as polylactic acid. Preferably, the filament FIL1 may contain polylactic acid in an amount of equal to or less than 90 wt. %, such as in the range of 50 to 90 wt. %, more preferably in the range of 50 to 80 wt. %, of the weight of the filament FIL1. Polylactic acid refers to thermoplastic aliphatic polyester, having a chemical formula $(C_3H_4O_2)_n$. Polylactic acid is also known as polylactide, polylactic acid polymer and PLA. Polylactic acid is a biodegradable polymer, as defined according to standard SFS-EN-13432. Polylactic acid may be derived from many renewable resources, such as from crop residues of corn, tapioca or sugarcane.

Polylactic acid is typically manufactured by direct condensation of lactic acid monomers or by ring-opening polymerization of lactide, which is a cyclic di-ester. Lactic acid has chiral nature, therefore polylactic acid may exist in several forms, such as poly-L-lactide or poly-D-lactide. Poly-L-lactide is semi-crystalline. Poly-D-lactide is amorphous.

Semi-crystalline polylactic acid typically undergoes thermal degradation at temperatures above 200° C. Polylactic acid homopolymers, such as poly-L-lactide, generally have a glass-transition temperature in the range of 60-65° C. a melt temperature in the range of 173-178° C. A suitable processing temperature for polylactic acid is therefore typically quite narrow, in the range of 185-190° C. The poly-L-lactide has a crystallinity in the range of 37% and a tensile modulus in the range of 2.7-16 GPa. The melting temperature of poly-L-lactide can be increased by 40-50° C. and its heat deflection temperature can be increased from approximately 60° C. to up to 190° C. by physically blending the polymer with PDLA (poly-D-lactide)

Filament Composition—Polypropylene

The filament FIL1 may contain semi-crystalline polymer, such as polypropylene. Polypropylene in this context refer polymers of propylene. Polypropylene may be in the form of a homopolymer, wherein all the repeating propene units along a chain are of the same type. Propylene may alternatively be in the form of a random or block copolymer, wherein the repeating propene units further contain another monomer unit. The polypropylene is preferably isotactic, wherein all of the methyl side groups are located on the same side of the polymer chain. Polypropylene is a polyolefin, which has a low surface free energy level and is highly resistant to many chemical solvents, bases and acids. Polypropylene may be arranged to provide filament material for additive manufacturing, wherein the filament and the formed product has antistatic characteristics. Due to the non-polar and low surface free energy characteristics, polypropylene is highly hydrophobic. Preferably, the filament FIL1 may contain polypropylene in an amount of equal to or less than 30 wt. %, such as in the range of 1 to 30 wt. %, more preferably in the range of 5 to 25 wt. %, most preferably in the range of 5 to 20 wt. %, of the weight of the filament FIL1. The filament FIL1 may further comprise elastomer modified polypropylene. Elastomer modified polypropylene may be configured to increase stiffness of the composite material, and hence the filament FIL1. An unsaturated elastomer in polypropylene may further be arranged to increase the impact strength, whereas saturated elastomers may be arranged to increase the stiffness of the filament FIL1. An elastomer modified polypropylene may therefore provide a higher melt strength, which facilitates the dispensing of the material in melt state. A composite melt having higher melt strength may be deposited in more precise portions, which may facilitate the printing of discontinuous shapes, such as shapes containing empty spaces between deposited material portions or layers.

Example 1—Comparative Data of the Thermomechanical Properties of the Filament Material Table 1 below, illustrates some mechanical and physical properties of composite materials. Samples and comparative samples were tested in view of their physical, mechanical and thermal properties. Sample 'S0' contains virgin polypropylene and 20 wt. % of chemical pulp of wood-based cellulose fibers. Sample 'S0' does not contain polylactic acid. Sample 'S1' consists of semi-crystalline polylactic acid, and does not contain chemical pulp of wood-based cellulose fibers. Sample S2 contains semi-crystalline polylactic acid and 20 wt. % of chemical pulp of wood-based cellulose fibers. Sample 'S2' does not contain polypropylene. Sample 'S3' contains 70 wt. % semi-crystalline polylactic acid, 10 wt. % of polypropylene and 20 wt. % of chemical pulp of wood-based cellulose fibers. Sample 'C1' is a reference sample containing a polymer blend based on polyesters such as polylactic acid, wood fibres in the range of 10-20% and additives. Sample 'C2' is another reference sample containing a polymer blend of polylactic acid and polyhydroxyalkanoate.

min (230° C., 2.16 kg, ISO 1133). Wood-based cellulose fibre has the effect of reducing the melt flow index of a composite material.

Referring to Table 1 above, the melt flow index of 80 g/10 min of the sample S0, wherein the matrix material was polypropylene, was the highest value of the tested samples. The melt flow index of the reference sample C1, containing recycled wood fibers and wherein the matrix material was polylactic acid was 46 g/10 min. In the samples S1, S2 and S3 containing semi-crystalline polylactic acid, the melt flow index was below 25 g/10 min. The melt flow index of the sample S1, containing only PLA, was 19 g/10 min. The melt flow index of the sample S2, further containing chemical pulp, was 10 g/10 min. The melt flow index of the sample S3, containing semi-crystalline polylactic acid, chemical pulp and polyproplylene, was 13 g/10 min. Thus, chemical pulp had an effect of reducing the melt flow index of the

TABLE 1

Properties of different composite material grades for additive manufacturing filament.

| Property | Unit | S0 | S1 | S2 | S3 | C1 | C2 | Standard |
|---|---|---|---|---|---|---|---|---|
| Physical | | | | | | | | |
| Density | g/cm$^3$ | 0.99 | 1.24 | 1.3 | 1.24 | 1.15 | 1.24 | ISO 1133 |
| Melt flow index (190° C./10 kg) | g/10 min | 80 | 19 | 10 | 13 | 46 | | ISO 1133 |
| Mechanical | | | | | | | | |
| Tensile Modulus (23° C., molded) | MPa | 2100 | 3700 | 5300 | 4700 | 3290 | 2960 | ISO 527/1 |
| Specific Modulus | Mpa/g/cm$^3$ | 2121 | 2984 | 4077 | 3790 | 2861 | 2387 | |
| Tensile strength (23° C., molded) | MPa | 33 | 65 | 58 | 52 | 46 | 61.5 | ISO/50 |
| Tensile strain at break (23° C., molded) | % | 7.5 | 10 | 1.6 | 3.6 | 5 | 10.5 | ISO 527/50 |
| Flexural Modulus | MPa | 2000 | 3490 | 5300 | 4440 | 3930 | 3295 | ISO 178 |
| Flexural Strength | MPa | 48 | 104 | 114 | 87 | 70 | 89 | ISO 178 |
| Impact strength | | | | | | | | |
| Charpy (unnotched) (23° C., molded) | kJ/m$^2$ | 31 | 23 | 23 | 21 | 19 | 31 | ISO 179/1eU |
| Charpy (unnotched) (23° C., printed) | kJ/m$^2$ | 12.5 | | 11.3 | 8.9 | 10.8 | | ISO 179/1eU |
| Thermal | | | | | | | | |
| Glass transition point ($T_g$) | ° C. | | 66 | 63 | 63 | 60 | | ISO 11357 |
| Crystallization point ($T_c$) | ° C. | | | 114 | 110 | 106 | | ISO 11357 |
| Other | | | | | | | | |
| Water absorption, 24 h | % | | 0.17 | 0.58 | 0.46 | | | ISO 62 |
| Water absorption, 192 h | % | | 0.41 | 1.7 | 1.26 | | | ISO 62 |
| Water absorption, 456 h | % | | 0.51 | 2.7 | 2.07 | | | ISO 62 |

Melt Flow Index

The melt flow index of the composite material containing semi-crystalline polylactic acid may be selected by controlling the amount of chemical pulp of wood-based cellulose fibre and/or polypropylene in the composite material. Typically, the melt flow index of polypropylene is considerably higher than the melt flow index of polylactic acid. Semi-crystalline polylactic acid for additive manufacturing has a melt flow index, which typically is in the range of 20 to 85 g/10 min (190° C., 10 kg, ISO 1133). Typically, polypropylene has a melt flow index in the range of 45 to 110 g/10 composite material. The chemical pulp further appeared to have an effect which differed of recycled wood fibres. Addition of polypropylene to composite comprising raises the melt flow index of the composite material therefore leading to better flowability. Advantageously, the composite melt MLT1 has a melt mass-flow index of less than 60 g/10 min, more advantageously less than 30 g/10 min, most advantageously less than 20 g/10 min (190° C., 10 kg, ISO 1133).

Tensile Strain at Break

The tensile strain at break may be determined from moulded samples similar as used for the impact strength.

The tensile strength of a three-dimensional composite product may further be determined from a sample having the shape of a dumb-bell-shaped test specimen type 1B, at a test speed of 50 mm/min, at a temperature of 23° C., in accordance with standard ISO 527-2 (version 2012).

Sample S1 had tensile strain at break value of 10%. Sample S2 had tensile strain at break value of 1.6%. Sample S3 had a tensile strain at break value of 3.6%. Hence, addition of chemical pulp of wood-based cellulose fibers to the composite material may reduce the tensile strain at break value.

Tensile Modulus

Referring to Table 1 above. The tensile modulus was determined at 23° C. at a test speed of 1 mm/min, at a temperature of 23° C., in accordance with standard ISO 527-2 (version 2012). The tensile modulus of the sample S0, wherein the matrix material was polypropylene was 2100 Mpa, which was the lowest value of the tested samples. The tensile modulus of the reference sample C1, containing recycled wood fibers and wherein the matrix material was polylactic acid was 3290 Mpa. In the samples S1, S2 and S3 containing semi-crystalline polylactic acid, the tensile modulus was higher, in the range of 3700 to 5300 Mpa. The tensile modulus of the sample S1, containing only PLA, was 3700 Mpa. The tensile modulus of the sample S2, further containing chemical pulp, was 5300 Mpa. Thus, chemical pulp had an effect of increasing the tensile modulus of the composite material. The tensile modulus of the sample S3, containing semi-crystalline polylactic acid, chemical pulp and polyproplylene, was 4700 Mpa. Thus, chemical pulp in combination with polypropylene had a less increasing effect on the tensile modulus of the composite material.

Specific Modulus

Referring to Table 1 above, chemical pulp in combination with polypropylene and polylactic acid may be used to increase the specific modulus of the composite material. Furthermore, chemical pulp may have an effect which differs of recycled wood fibres. The specific modulus of the sample S0, wherein the matrix material was polypropylene was 2121 Mpa, which was the lowest value of the tested samples. The specific modulus of the reference sample C1, containing recycled wood fibers and wherein the matrix material was polylactic acid was 2861 Mpa. In the samples S1, S2 and S3 containing semi-crystalline polylactic acid as matrix material, the specific modulus was in the range of 2984 to 4077 Mpa, which was higher than in the reference sample C1. The specific modulus of the sample S1, containing only PLA, was 2984 Mpa. The specific modulus of the sample S2, further containing chemical pulp, was 4077 Mpa. Thus, chemical pulp had an effect of increasing the specific modulus of the composite material. The specific modulus of the sample S3, containing semi-crystalline polylactic acid, chemical pulp and polyproplylene, was 3790 Mpa.

Based on the results of table 1, the lignin content and bulk density of the wood-based cellulose fibre may thus have an effect on the specific modulus. Chemical pulp may be used for improving the stiffness-driven formation of a 3D printed product without a supporting mould. The filament formed of such composite material may be arranged to have a specific modulus higher than 2 GPa/g/cm$^3$, advantageously higher than 3 GPa/g/cm$^3$, most advantageously equal to or higher than 4 GPa/g/cm$^3$.

Flexural Modulus

Flexural modulus is a measure of stiffness under bending. Flexible materials such as elastomers have lower values than fiber reinforced. Flexural strength measures materials ability to resist deformation under load. A filament suitable for use in additive manufacturing by extrusion may be arranged to comprise flexural modulus and tensional strength, such that it may be fed into an additive manufacturing system. Advantageously, a filament formed of composite material for additive manufacturing would have high flexural strength and low flexural modulus. By providing a filament which bends due to a load applied on the filament, breaking of the filament may be avoided upon feeding of the filament to an additive manufacturing system.

A filament formed of composite material which contains both semi-crystalline polylactic acid as a matrix material and wood-based cellulose fibre may be arranged to have flexural modulus equal to or less than 6 GPa. The filament may further comprise polypropylene. Polypropylene has the effect of improving the flexibility of the material. The filament material in melt state may have high stiffness which facilitates precise dispensing of the material from an addition manufacturing system.

A typical flexural modulus of polypropylene is around 1.5 Gpa/g/cm$^3$. Chemical pulp may be used for increasing the flexural modulus of a 3D printed product without a supporting mould. Polypropylene may be used for improving the softness and flexibility of a filament formed of polylactic acid comprising wood-based cellulose fibres, such as chemical pulp.

Referring to Table 1 above, the flexural modulus were measured by three-point loading test at a rate of 2 mm/min, in accordance with method B of the standard ISO 178 (version 2015), a specific modulus higher than 2 GPa/g/cm$^3$.

Based on the results of table 1, polypropylene in combination with chemical pulp has an effect on the flexural modulus. Sample S2, containing 80 wt. % of polylactic acid and 20 wt. % of chemical pulp of wood-based cellulose fibers, has a flexural modulus value of 5300 Mpa. Sample S3, containing 70 wt. % of polylactic acid, 10 wt. % of polypropylene and 20% of chemical pulp of wood-based cellulose fibers, has a flexural modulus value of 4440 Mpa. When comparing samples S2 and S3, it may be observed that by adding polypropylene to the composite material, the flexural modulus may be decreased, indicating improvement in the flexibility. By providing a composite formed of polylactic acid, chemical pulp and further comprising 10 wt. % of polypropylene, the flexural modulus may be reduced by at least 10%, such as equal to or more than 12%, when compared to a corresponding composite without polypropylene.

A filament may be arranged to comprise polylactic acid, wood-based cellulose fibres and polypropylene such that the flexural modulus of the material is equal to or less than 6 GPa, such as in the range 2 to 6 GPa/g/cm$^3$, advantageously higher than 3 GPa/g/cm$^3$, most advantageously higher than 4 GPa/g/cm$^3$. The flexural modulus of the sample S0, wherein the matrix material was polypropylene was 2000 Mpa, which was the lowest value of the tested samples. The flexural modulus of the reference sample C1, containing recycled wood fibers and wherein the matrix material was polylactic acid was 3930 Mpa. In the samples S1, S2 and S3 containing semi-crystalline polylactic acid as matrix material, the flexural modulus was in the range of 3490 to 5300 Mpa. The flexural modulus of the sample S1, containing only PLA, was 3490 Mpa. The flexural modulus of the sample S2, further containing chemical pulp, was 5300 Mpa. Thus, chemical pulp had an effect of increasing the flexural modulus of the composite material. The flexural modulus of the sample S3, containing semi-crystalline polylactic acid, chemical pulp and polyproplylene, was 4400 Mpa.

Water Absorption

Referring to Table 1 above, polypropylene may be used to reduce the water absorption of the composite material comprising chemical pulp and polylactic acid. In samples S1, S2 and S3 comprising chemical pulp, the amount of water absorbed by a dry test specimen of a filament comprising polypropylene, at 22° C. from air having 50% relative humidity during a time period of 24 hours, was observed to be less than 0.6 wt. % of the weight of the dry test specimen, wherein before the determination, the test specimen has been dried at a temperature of 120° C. for 48 hours, in accordance with standard ISO 62 (version 2008). The amount of water absorbed during a time period of 192 hours, was observed to be less than 1.75 wt. % of the weight of the dry test specimen, wherein before the determination, the test specimen has been dried at a temperature of 120° C. for 48 hours, in accordance with standard ISO 62 (version 2008).

Example 2—Comparative Data of the Melt Rheology of the Filament Material

Figure 7:
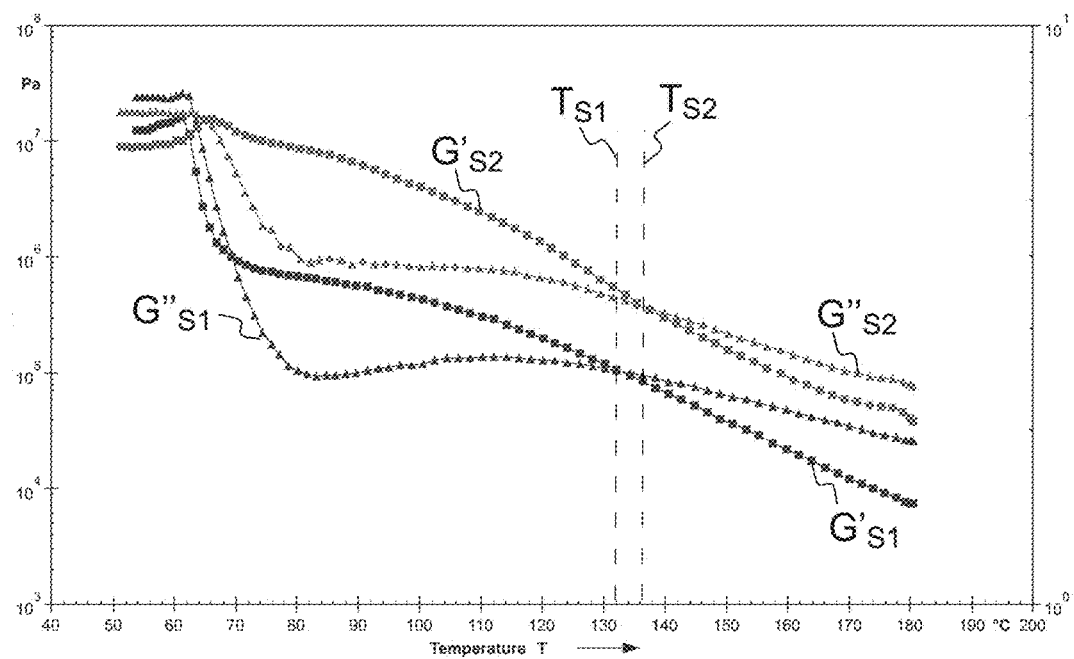
FIGS. 7 and 8 illustrate the shear loss modulus curve G" and the shear storage modulus curve G' as a function of temperature, in composite materials comprising polylactic acid. A composite material also containing polypropylene was observed to have higher cross-over temperature, denoting the point where the two curves G' and G" intersect.
Figure 8:
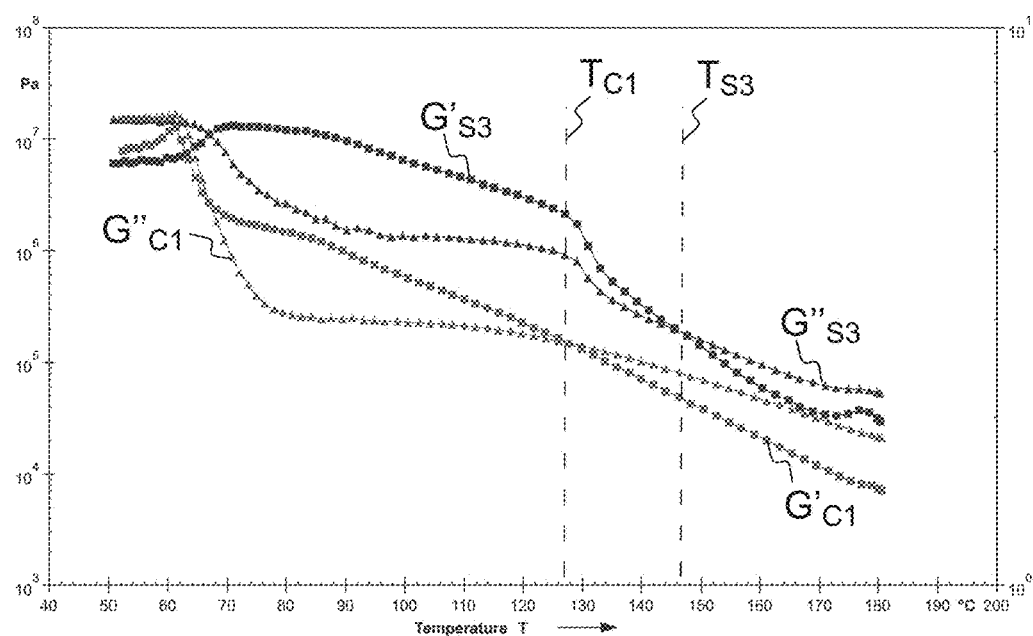

Referring to FIGS. 7 and 8. The figures illustrate the shear loss modulus curve G" and the shear storage modulus curve G' as a function of temperature T, in composite material samples S1, S2, S3 and C1 comprising polylactic acid, the samples corresponding to those disclosed in example 1 above. The dynamic rheological properties of the composite melts were determined by means of an oscillatory rheometer with a parallel-plate geometry in test conditions as disclosed below.

Test Conditions:
Measuring system: Parallel plates geometry, setup PP25-SN5319, disc diameter 25 mm, gap 0.6 mm
Strain amplitude: 0.1%, in linear viscoelastic region
Frequency: 1 Hz
Temperature ramp: 180 to 25° C., linear rate of 5° C./min, Continuous Ramp, 5 points per decade
Test device: Anton Paar MCR 301

The test was conducted following the manufacturer's instructions and according to ISO standard 6721-10:2015, which is equivalent to standard ASTM D4440-15.

The vertical axis in the figures represents the force applied in Pascals (Pa).

The horizontal axis in the figures represents the temperature (T).

The curves $G'_{S1}$, $G'_{S2}$, $G'_{S3}$, $G'_{C1}$ represent the shear storage modulus curves of samples S1, S2, S3 and C1, respectively.

The curves $G''_{S1}$, $G''_{S2}$, $G''_{S3}$, $G''_{C1}$ represent the shear loss modulus curves of samples S1, S2, S3 and C1, respectively.

The dashed lines $T_{S1}$, $T_{S2}$, $T_{S3}$ and $T_{C1}$ represent the cross-over temperature, wherein the shear loss modulus is equal to the shear storage modulus, i.e. $G'=G''$.

Table 2 below discloses the cross-over temperature values determined from the samples of composite material.

TABLE 2

Temperature values of the cross-over point in samples of composite material comprising polylactic acid, the cross-over point denoting the intersection point of the two curves G' and G", wherein the shear loss modulus is equal to the shear storage modulus.

| Sample | cross-over point (° C.) |
|---|---|
| C1 | 126 |
| S1 | 132 |
| S2 | 136 |
| S3 | 146 |

Table 2 demonstrates, that $T_{C1}=126°$ C., $T_{S1}=132°$ C., $T_{S2}=136°$ C. and $T_{S3}=146°$ C. The sample S2, composite material containing polylactic acid and chemical pulp of wood-based cellulose fibers, was observed to have a cross-over temperature equal to or higher than 135° C., which was higher than the cross-over temperature of the sample S1. A composite material also containing polypropylene was observed to have the highest cross-over temperature, equal to or higher than 145° C. Use of polypropylene in a composite material thus shifts the temperature, where the composite melt begins to support its own weight, upon cooling. Such composite melt is more elastic, when the composite melt is cooled down. Hence, a filament for additive manufacturing containing polypropylene, polylactic acid and wood-based cellulose fibres is less sensitive to cooling, and has improved dimensional stability. A filament containing polypropylene, polylactic acid and chemical pulp of wood-based cellulose fibers may thus be configured to have G">G' at a higher temperature. A filament containing polylactic acid and chemical pulp of wood-based cellulose fibers may be arranged to have a cross-over point $G'/G''=1$ at a temperature equal to or higher than 135° C. A filament containing polypropylene polylactic acid and chemical pulp of wood-based cellulose fibers may be arranged to have a cross-over point $G'/G''=1$ at a temperature equal to or higher than 140° C., preferably equal to or higher than 145° C.

Example 3—Comparative Data of the Heat Deflection Temperature of the Filament Material Table 3 below provides experimental data of the effect of chemical pulp of wood-based cellulose fiber and polypropylene on heat deflection temperature of the filament comprising composite material. The heat deflection temperature was measured from composite material samples S1, S2 and S3 corresponding to those disclosed in example 1 above. The heat deflection temperatures were determined under constant flexural stress of 1.8 MPa, in accordance with method A of the standard ISO 75-2 (version 2013).

TABLE 3

Heat deflection temperatures determined of samples S1 to S3.

| Sample | HDT (° C.) |
|---|---|
| S1 | 54.0 |
| S2 | 103.2 |
| S3 | 56.2 |

Based on the results of sample S1, a filament containing polylactic acid has a low heat deflection temperature of less than 60° C. Based on the results of sample S2, a filament containing polylactic acid and chemical pulp of wood-based cellulose fibers may be arranged to have a considerably higher heat deflection temperature of equal to or higher than 90° C., even equal to or higher than 90° C. The chemical pulp of wood-based cellulose fibers may thus be arranged to increase the heat deflection temperature of the filament. Based on the results of sample S3, a filament containing polypropylene, polylactic acid and chemical pulp of wood-based cellulose fibers may be arranged to have an equal or marginally higher heat deflection temperature than a filament containing only polylactic acid. However, when compared to sample S2, the introduction of polypropylene to a filament containing polylactic acid and wood-based cellulose has the effect of decreasing the heat deflection temperature. Hence, polypropylene may be introduced to the filament material such that a higher heat deflection temperature, compared to that of polylactic acid, is obtained.

Example 4—Comparative Data of the Impact Strength of the Filament Material

Figure 9:
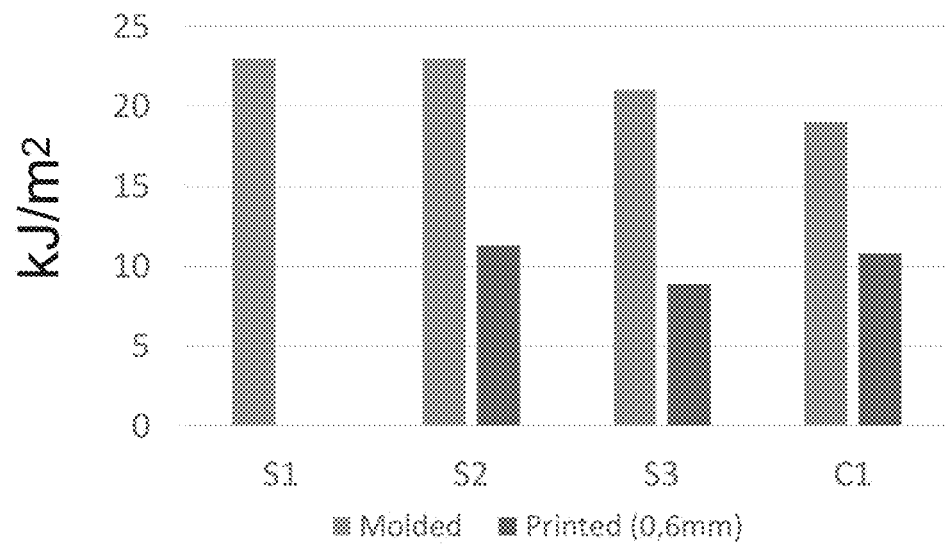
FIGS. 9 and 10 illustrate the impact strength of composite materials comprising polylactic acid. The impact strength of two samples prepared from the same material by different manufacturing methods was observed to differ. A composite material also containing polypropylene was observed to have reduced impact strength.

Referring to Table 1 and FIG. 9. FIG. 9 represents a comparison of impact strength values of injection moulded and samples printed by means of addition manufacturing by extrusion. The vertical axis indicates the impact strength value in kilojoules per square meter (kJ/m$^2$). The samples corresponded to those disclosed in example 1, above. Samples S2, S3 and C1 were prepared both as injection moulded (light gray colour, left) and as printed samples (dark gray colour, right). Charpy impact strength values were determined at 23° C. according to standard ISO 179-1 (version 2010), using unnotched edge. The standard is also known as ISO 179/1eU. Each sample used in the impact strength measurement had a dumb-bell-shape with dimensions of 80×10×4 mm.

The Charpy Impact strength was determined according to standard ISO 179/1eU, at 23° C., using sample specimens having dimensions of 80×10×4 mm.

The impact strength values of Table 1 were determined from injection moulded samples, referred to as "moulded" in Table 1, and three-dimensional composite product samples having layers, obtained with an additive manufacturing system, referred to as "printed" in Table 1.

The printed samples were printed in layers, such that each layer was printed as a continuous flow of material. Each layer was printed separately such that the subsequent layer was printed on top of an already solidified layer. The layers were printed adjacent to each other in direction $S_x$ substantially parallel to the platform surface $Surf_{PLT}$. The successively extruded portions of the composite melt thus form the three-dimensional composite product. Therefore the length of 80 mm was formed in the direction $S_x$ with 0.2 mm layer thickness, at a lateral movement $V_x$ of 30 mm/s, using 100% infill, with 0.6 mm nozzle.

Sample S1, when injection moulded, had a Charpy unnoched impact strength at 23° C. of 23 kJ/m$^2$. Samples S2 and S3, when injection moulded, had Charpy unnoched impact strength at 23° C. of 23 and 21 kJ/m$^2$, respectively. Sample C1, when injection moulded, had a Charpy unnoched impact strength at 23° C. of 19 kJ/m$^2$. Based on the results, composite material comprising polylactic acid and around 20 wt. % of chemical pulp of wood-based cellulose fiber has impact strength properties similar to pure PLA. However, a product obtained by means of additive manufacturing by extrusion differed from the product obtained by injection moulding. Samples S2 and S3, when injection moulded, had Charpy unnoched impact strength at 23° C. of 11.3 and 8.9 kJ/m$^2$, respectively. Sample C1, when injection moulded, had a Charpy unnoched impact strength at 23° C. of 10.8 kJ/m$^2$.

Each layer of the sample formed represents a block of composite material formed by dispensing a continuous flow of composite melt in direction Sx. Within the layer, no interfaces exist. The formed sample, however contains interfaces between the layers. Hence, a composite product comprising layers adhered to each other in direction $S_z$ substantially parallel to the normal of the platform surface $N_{PLT}$ may comprise a first impact strength in a first direction $S_x$ substantially parallel to the reference plane REF0 parallel to the layers of the three-dimensional product comprising layers, and a second impact strength in a second direction $S_z$ substantially perpendicular to the reference plane REF0, wherein the first impact strength differs from the second impact strength, when determined as Charpy impact strength values at 23° C. according to standard ISO 179/1eU. The first impact strength may be equal to or less than 20 kJ/m$^2$, preferably equal to or less than 15 kJ/m$^2$, such as in the range of 5 to 15 kJ/m$^2$.

Thus, additive manufacturing by extrusion may be arranged to obtain a three-dimensional product having layers, wherein the mechanical properties of the product, such as tensile strength and/or impact strength, differ from a product obtained from the same composite material by other means, such as by injection moulding.

Example 5—Effect of Polypropylene to the Impact Strength

Figure 10:
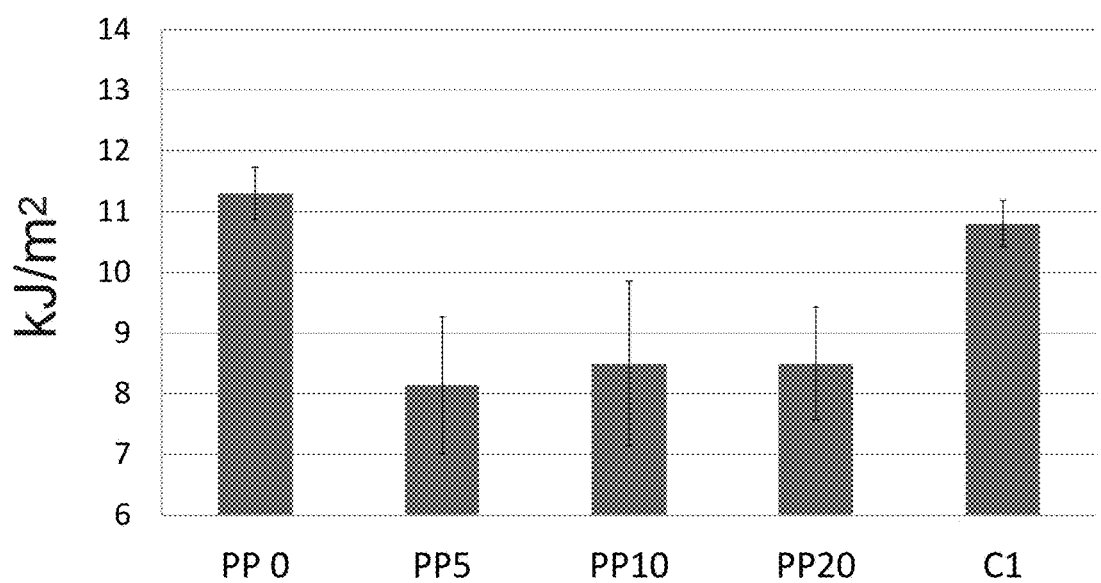

Referring to FIG. 10 and Table 4 below. FIG. 10 represents a comparison of impact strength values of composite material samples printed by means of addition manufacturing by extrusion, comprising polylactic acid and/or different amounts of polypropylene. The reference sample C1 corresponded to the sample C1 disclosed in example 1, above. Four samples PP0, PP5, PP10 and PP20 comprising 20 wt. % of chemical pulp, polylactic acid as matrix material and polypropylene in the amounts of 0, 5, 10 or 20 wt. %, respectively, were compared to the reference sample C1. The vertical axis indicates the impact strength value in kilojoules per square meter (kJ/m$^2$). The vertical lines on top of the sample bars represent standard deviation The values of Table 4 correspond to the values indicated by the sample bars in FIG. 10. Table 4 provides experimental data of the effect of the amount of polypropylene on the Charpy unnotched impact strength of the filament.

TABLE 4

| Impact strength values of reference sample C1 and samples PP0, PP5, PP10 and PP20. | | | | | |
|---|---|---|---|---|---|
| Sample | PP0 | PP5 | PP10 | PP20 | C1 |
| Charpy Unnotched Impact Strength | 11.3 | 8.14 | 8.5 | 8.5 | 10.8 |

As can be seen from FIG. 10 and table 4, the addition of polypropylene decreases impact strength. However, the amount of polypropylene, when in the range of 5 to 20 wt. %, did not have a significant effect on the Charpy unnotched impact strength.

Example 6—Comparative Data of Complex Viscosity of Filament Composite Material

Figure 11:
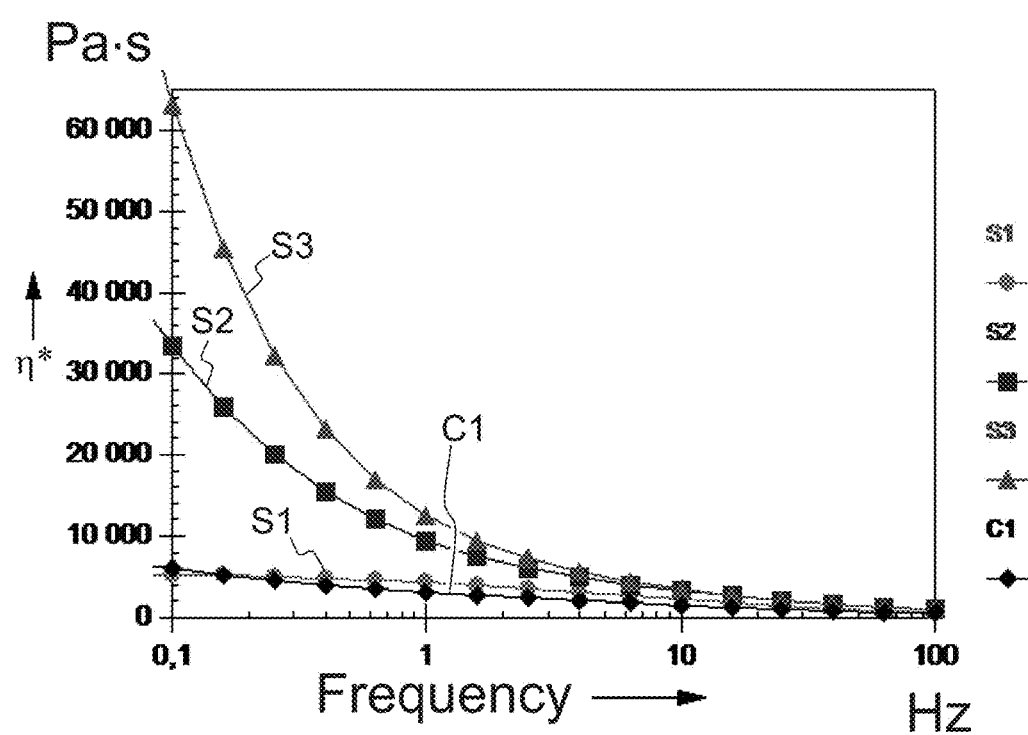
FIG. 11 illustrates the complex viscosity η* of composite materials as a function of frequency. Composite materials comprising chemical pulp of wood-based cellulose fibres was observed to have higher complex viscosity. A composite material further containing polypropylene was observed to have the highest complex viscosity.

Referring to FIG. 11. The figures illustrate the complex viscosity η* as a function of frequency, in composite material samples S1, S2, S3 and C1 comprising polylactic acid, the samples corresponding to those disclosed in example 1 and 2 above. The dynamic rheological properties of the composite melts were determined by means of an oscillatory rheometer with a parallel-plate geometry in test conditions as disclosed below.

Test Conditions:
Measuring system: Parallel plates geometry, setup PP25-SN5319, disc diameter 25 mm, gap 0.6 mm
 Strain amplitude: 0.1%, in linear viscoelastic region
 Frequency sweep: 0.01 to 100 Hz
 Frequency Slope: 5 points per decade
 Temperature: 180° C.
 Test device: Anton Paar MCR 301

The test was conducted following the manufacturer's instructions and according to ISO standard 6721-10:2015, which is equivalent to standard ASTM D4440-15.

The vertical axis in the figures represents the complex viscosity $\eta^*$ in units of pascal-second (Pa·s).

The horizontal axis in the figures represents the frequency in units of Herz (Hz).

The curves S1, S2, S3 and C1 represent the complex viscosity $\eta^*$ of samples S1, S2, S3 and C1, respectively, as a function of frequency.

Table 5 below discloses the complex viscosity $\eta^*$ of samples S1, S2, S3 and C1 at frequency of 0.1 Hz and 1 Hz.

The frequency value determined at 0.1 Hz frequency by frequency sweep measurement represents a situation in method for manufacturing a three-dimensional composite product according to a model with an additive manufacturing system, wherein a portion of the composite melt is dispensed at a time from the nozzle such that the portion of the composite melt adheres on a platform or another layer. Hence, the frequency value of 0.1 Hz represents the behavior of the composite melt formed of the filament material when the composite melt is substantially stationary, either prior to flowing or after flowing. In other words, the frequency value of 0.1 Hz represents the behavior of the composite melt which does not flow yet, or is about to stop flowing, for example after exiting from a nozzle.

The frequency value determined at 1 Hz frequency by frequency sweep measurement represents a situation in method for manufacturing a three-dimensional composite product according to a model with an additive manufacturing system, wherein a dispensed portion of the composite melt is being converted into a composite element. The frequency value of 1 Hz approximates the cooling time of the composite melt being formed of the filament material at a speed corresponding to the lateral movement of the nozzle and/or the platform. Thus, the frequency value of 1 Hz illustrates the cooling rate of dispensed composite melt

TABLE 5

Complex viscosity $\eta^*$ of samples S1, S2, S3 and C1 at frequency of 0.1 Hz and 1 Hz in units of pascal-second (Pa · s).

| Sample | $\eta^*$ (0.1 Hz) | $\eta^*$ (1 Hz) |
| --- | --- | --- |
| S1 | 5227 | 4357 |
| S2 | 33499 | 9427 |
| S3 | 63023 | 12527 |
| C1 | 6094 | 3127 |

As demonstrated in Table 5 above, in sample S1 consisting of semi-crystalline polylactic acid, and not containing chemical pulp of wood-based cellulose fibers, the complex viscosity $\eta^*$ is less than 6000 Pa·s both at a frequency of 0.1 Hz and at a frequency of 1 Hz. In sample S2 containing semi-crystalline polylactic acid and 20 wt. % of chemical pulp of wood-based cellulose fibers, the complex viscosity $\eta^*$ is 33499 Pa·s at a frequency of 0.1 Hz and 9427 Pa·s at a frequency of 1 Hz. In sample S3 containing 70 wt. % of semi-crystalline polylactic acid, 10 wt. % of polypropylene and 20 wt. % of chemical pulp of wood-based cellulose fibers, the complex viscosity $\eta^*$ is 12527 Pa·s at a frequency of 1 Hz and 63023 Pa·s at a frequency of 0.1 Hz.

Based on FIG. 11 and table 5, when tested in conditions as described above, a filament suitable for use in additive manufacturing by extrusion formed of composite material comprising semi-crystalline polylactic acid and chemical pulp of wood-based cellulose fibres may be arranged to comprise an amount in the range of 5-30 wt. % of the weight of the filament of chemical pulp wood-based cellulose fibers, such that the composite material of the filament has a complex viscosity $\eta^*$ of equal to or higher than 10000 Pa·s, preferably equal to or higher than 20000 Pa·s, most preferably equal to or higher than 30000 Pa·s, when determined at a frequency of 0.1 Hz, such that upon additive manufacturing by extrusion, composite melt formed of the filament has a ratio of shear storage modulus to shear loss modulus equal to or higher than 1.0 at a temperature $T_{sub}$ equal to or higher than 133° C.

Further based on FIG. 11 and table 5, when tested in conditions as described above, a filament suitable for use in additive manufacturing by extrusion formed of composite material comprising semi-crystalline polylactic acid and chemical pulp of wood-based cellulose fibres may be arranged to comprise an amount in the range of 5-30 wt. % of the weight of the filament of chemical pulp wood-based cellulose fibers, such that the composite material of the filament has a complex viscosity $\eta^*$ of equal to or higher than 5000 Pa·s, preferably equal to or higher than 7000 Pa·s, most preferably equal to or higher than 9000 Pa·s, when determined at a frequency of 1 Hz, such that upon additive manufacturing by extrusion, composite melt formed of the filament has a ratio of shear storage modulus to shear loss modulus equal to or higher than 1.0 at a temperature $T_{sub}$ equal to or higher than 133° C.

Further based on FIG. 11, table 2 and table 5, when tested in conditions as described above, a filament suitable for use in additive manufacturing by extrusion formed of composite material comprising semi-crystalline polylactic acid and chemical pulp of wood-based cellulose fibres may be arranged to comprise an amount in the range of 5-30 wt. % of the weight of the filament of chemical pulp wood-based cellulose fibers, and polypropylene in an amount in the range of 5-20 wt. % such that the composite material of the filament has a complex viscosity $\eta^*$ of equal to or higher than 15000 Pa·s, preferably equal to or higher than 35000 Pa·s, most preferably equal to or higher than 50000 Pa·s, when determined at a frequency of 0.1 Hz, such that upon additive manufacturing by extrusion, composite melt formed of the filament has a ratio of shear storage modulus to shear loss modulus equal to or higher than 1.0 at a temperature $T_{sub}$ equal to or higher than 140° C.

Further based on FIG. 11, table 2 and table 5, when tested in conditions as described above, a filament suitable for use in additive manufacturing by extrusion formed of composite material comprising semi-crystalline polylactic acid and chemical pulp of wood-based cellulose fibres may be arranged to comprise an amount in the range of 5-30 wt. % of the weight of the filament of chemical pulp wood-based cellulose fibers, and polypropylene in an amount in the range of 5-20 wt. % such that the composite material of the filament has a complex viscosity $\eta^*$ of equal to or higher than 5000 Pa·s, preferably equal to or higher than 9000 Pa·s, most preferably equal to or higher than 12000 Pa·s, when determined at a frequency of 1 Hz, such that upon additive manufacturing by extrusion, composite melt formed of the filament has a ratio of shear storage modulus to shear loss modulus equal to or higher than 1.0 at a temperature $T_{sub}$ equal to or higher than 140° C.

For the person skilled in the art, it will be clear that modifications and variations of the filament, product and the method according to the present invention are perceivable. The figures are schematic. The particular examples described above with reference to the accompanying drawings are illustrative only and not meant to limit the scope of the invention, which is defined by the appended claims.

The invention claimed is:

1. A filament suitable for use in additive manufacturing by extrusion without a mould,
the filament formed of composite material comprising
semi-crystalline polylactic acid and
chemical pulp of wood-based cellulose fibres having a low lignin content of less than 5% of the weight of the chemical pulp,
wherein the amount of chemical pulp of wood-based cellulose fibres has been selected such that the composite material of the filament has a complex viscosity of equal to or higher than 10000 Pa·s when determined at 0.1 Hz frequency and at 180° C. temperature, such that upon additive manufacturing by extrusion, composite melt formed of the filament has a ratio of shear storage modulus to shear loss modulus equal to or higher than 1.0 at a temperature equal to or higher than 133° C.,
thereby obtaining the filament suitable to be used in additive manufacturing by extrusion without a mould.

2. The filament according to claim 1, the filament further comprising polypropylene homopolymer or copolymer.

3. The filament according to claim 2, wherein the filament has a ratio of shear storage modulus to shear loss modulus equal to or higher than 1.0 at a temperature equal to or higher than 140° C., when determined from a sample of the composite material with parallel plates geometry of 25 mm diameter and a gap of 0.6 mm, at 0.1% strain, at 1 Hz frequency, under temperature ramp having a linear rate of 5° C./min in a temperature range of 180° C. to 25° C., in accordance with ISO standard 6721-10:2015.

4. The filament according to claim 1, the filament further in a temperature of 25° C. having
a flexural modulus equal to or less than 6 GPa, and
a specific modulus higher than 2 GPa/g/cm$^3$.

5. The filament according to claim 1, the composite material having a dimensional moulding shrinkage of less than 1.15% upon solidification from melt.

6. The filament according to claim 1, the chemical pulp of wood-based cellulose fibres having a fibre length weighted average fiber length of equal to or less than 0.4 mm.

7. The filament according to claim 1, wherein the chemical pulp of wood-based cellulose fibres has a lignin content equal to or less than 0.5% of the weight of the chemical pulp.

8. The filament according to claim 1, the composite material comprising
semi-crystalline polylactic acid in an amount in the range of 50-90 wt. % of the weight of the filament,
chemical pulp of wood-based cellulose fibres in an amount in the range of 5-30 wt. % of the weight of the filament, and
polypropylene homopolymer or copolymer in an amount of equal to or less than 30 wt. %.

9. The filament according to claim 1, the composite material comprising
semi-crystalline polylactic acid in an amount in the range of 50 to 70 wt. % of the weight of the filament,
chemical pulp of wood-based cellulose fibres in an amount of equal to or less than 20 wt. % of the weight of the filament,
polypropylene homopolymer or copolymer in an amount of equal to or less than 20 wt. % of the weight of the filament, and
maleic acid grafted polypropylene homopolymer or copolymer in an amount of equal to or less than 5 wt. % of the weight of the filament,
such that the total amount of the components equals to 100 wt. % of the weight of the filament.

10. The filament according to claim 1, wherein the amount of water absorbed by a dry test specimen at 22° C. from air having 50% relative humidity during a time period of 24 hours is less than 0.6 wt. % of the weight of the dry test specimen, wherein before the determination, the test specimen has been dried at a temperature of 120° C. for 48 hours, in accordance with standard ISO 62 (version 2008).

11. The filament according to claim 1, the filament having a maximum cross-sectional width equal to or less than 5 mm.

12. The filament according to claim 1, the filament having a shape ratio equal to or higher than 100, measured as the filament length to the filament maximum cross-sectional dimension perpendicular to the filament length.

13. A method for manufacturing a three-dimensional composite product according to a model with an additive manufacturing system, the method comprising
obtaining a model of a composite product on an additive manufacturing system, the model defining a shape of a three-dimensional composite product,
supplying a filament according to claim 1 comprising semi-crystalline polylactic acid and chemical pulp of wood-based cellulose fibres to a heater unit on the additive manufacturing system, such that a part of the filament at a time is fed to the heater unit,
heating each part of the filament fed to the heater unit to a processing temperature higher than the melting temperature of the semi crystalline polylactic acid, thereby forming portions of composite melt corresponding to the parts of the filament fed to the heater unit,
dispensing a portion of the composite melt at a time from a nozzle having a hole width, and
controlling the dispensing operation such that portions of the composite melt adhere together on a platform according to the model, thereby forming the three-dimensional composite product,
wherein the amount of chemical pulp of wood-based cellulose fibres in the filament has been selected such that the composite material of the filament has a complex viscosity of equal to or higher than 10000 Pa·s when determined at 0.1 Hz frequency and at 180° C. temperature, such that upon additive manufacturing by extrusion, composite melt formed of the filament has a ratio of shear storage modulus to shear loss modulus equal to or higher than 1.0 at a temperature equal to or higher than 133° C.

14. The method according to claim 13, wherein the processing temperature is below 230° C.

15. The method according to claim 13, further comprising supplying the filament to the heater unit with a pulling force, wherein the pulling force is less than the tensile strain at break of the filament.

16. The method according to claim 13, further comprising feeding the filament to the heater unit at a feeding velocity in the range of 10 to 100 mm/second.

17. The method according to claim 16, further comprising controlling the feeding velocity and/or the lateral movement of the nozzle and/or the platform according to the model, such that upon cooling in contact with the platform or another portion of the composite melt, the dispensed portions of the composite melt are converted into composite elements having a thickness and a width corresponding to the dimensions of the hole of the nozzle.

18. The method according to claim 17, further comprising controlling the feeding velocity and/or the lateral movement of the nozzle and/or the platform according to the model, such that composite elements adhere to each other in a plane parallel to the platform surface, thereby producing a material layer.

19. The method according to claim 18, further comprising controlling the feeding velocity and/or the vertical movement of the nozzle and/or the platform according to the model, such that material layers adhere to each other in direction substantially parallel to the normal of the platform surface, thereby producing a three-dimensional product having layers.

20. A product obtainable according to claim 13.

21. The product according to claim 20, the product comprising
a first impact strength in a first direction substantially parallel to the reference plane parallel to the layers of the three-dimensional product comprising layers, and
a second impact strength in a second direction substantially perpendicular to the reference plane,
wherein the first impact strength differs from the second impact strength.

* * * * *